United States Patent
Kiyose

(10) Patent No.: US 8,610,903 B2
(45) Date of Patent: Dec. 17, 2013

(54) OPTICAL POSITION DETECTION APPARATUS AND APPLIANCE HAVING POSITION DETECTION FUNCTION

(75) Inventor: Kanechika Kiyose, Matsumoto (JP)

(73) Assignee: Seiko Epson Corporation (JP)

( * ) Notice: Subject to any disclaimer, the term of this patent is extended or adjusted under 35 U.S.C. 154(b) by 191 days.

(21) Appl. No.: 13/197,119

(22) Filed: Aug. 3, 2011

(65) Prior Publication Data
US 2012/0033231 A1 Feb. 9, 2012

(30) Foreign Application Priority Data
Aug. 4, 2010 (JP) ................... 2010-175120

(51) Int. Cl.
*G01B 11/14* (2006.01)
(52) U.S. Cl.
USPC .......................................... 356/614; 356/621
(58) Field of Classification Search
USPC .......................................... 356/614–625, 445
See application file for complete search history.

(56) References Cited

U.S. PATENT DOCUMENTS

| 6,953,926 B2 | 10/2005 | Reime | |
|---|---|---|---|
| 7,764,381 B2 * | 7/2010 | Kamijima | 356/445 |
| 8,379,226 B2 * | 2/2013 | Kiyose | 356/614 |
| 8,400,642 B2 * | 3/2013 | Nakanishi | 356/621 |
| 2009/0295744 A1 * | 12/2009 | Onishi | 345/173 |
| 2010/0020334 A1 * | 1/2010 | Nakanishi | 356/614 |
| 2011/0128554 A1 * | 6/2011 | Nakanishi | 356/621 |
| 2011/0278456 A1 | 11/2011 | Kiyose | |

FOREIGN PATENT DOCUMENTS

JP 2003-534554 11/2003

\* cited by examiner

*Primary Examiner* — Sang Nguyen
(74) *Attorney, Agent, or Firm* — Harness, Dickey & Pierce, P.L.C.

(57) ABSTRACT

An optical position detection apparatus detects the position of a target object based on the result of the light reception through a light receiving unit when a light source is turned on. In a front-side housing portion of a housing of an optical unit, a reflection unit for generating a default light that makes the default light be incident to the light receiving unit is configured even in a state where a target object is not present. Accordingly, the initial setting of the relationship between a drive current in the light source unit and a light intensity in the light receiving unit can be appropriately performed based on the result of receiving the default light.

14 Claims, 22 Drawing Sheets

OPTICAL POSITION DETECTION APPARATUS AND APPLIANCE HAVING POSITION DETECTION FUNCTION

BACKGROUND

1. Technical Field

The present invention relates to an optical position detection apparatus optically detecting the position of a target object and an appliance having a position detection function provided with the optical position detection apparatus.

2. Related Art

An optical position detection apparatus optically detecting a target object has been proposed, in which, for example, a first light source unit and a second light source unit emit detection light toward the target object, and a light receiving unit detects the detection light that is reflected from the target object. According to this optical position detection apparatus, the position of the target object can be detected based on a comparison result of light intensities in the light receiving unit when the first light source unit and the second light source unit are sequentially turned on and a comparison result of the drive current when the first light source unit and the second light source unit are controlled so that the light intensities in the light receiving unit become equal to each other in a case where the first light source unit and the second light source unit are sequentially turned on (for example, see JP-A-2003-534554).

The optical position detection apparatus described in JP-A-2003-534554 detects the position of the target object by using the relationship between the emission intensity of the detection light from a plurality of light source units and the light intensity in the light receiving unit. Accordingly, if there is a difference in the relationship between the drive current and the emission intensity in the light source unit or if there is a difference in the relationship between the incident light quantity and the signal intensity in the light receiving unit, the detection accuracy is deteriorated. Accordingly, in the optical position detection apparatus, it is necessary to appropriately perform initial setting of the relationship between the drive current of the light source units and the light intensities in the light receiving unit. Further, in the optical position detection apparatus, it is preferable to appropriately perform the initial setting of the relationship between the drive current and the light intensity whenever the optical position detection apparatus starts operation.

However, since JP-A-2003-534554 fails to describe the necessity of the initial setting as described above, the technique described in JP-A-2003-534554 has a problem in that it is difficult to constantly set an appropriate condition with respect to the relationship between the drive current and the light intensity.

In FIG. 1 of JP-A-2003-534554, a light transmissive member is arranged on the front side of the first light source unit, the second light source unit, and the light receiving unit, and if the first light source unit and the second light source unit are turned on in conditions where a target object is present, the light that is reflected by the light transmissive member is also incident to the light receiving unit together with the light that is reflected by the target object. However, JP-A-2003-534554 fails to describe that a default light is incident to the light receiving unit through turning on the first light source unit and the second light source unit in a state where the target object is not present or the relationship between the drive current and the light intensity is initially set based on the result of receiving the default light in the light receiving unit.

SUMMARY

An advantage of some aspects of the invention is to provide an optical position detection apparatus and an appliance having a position detection function provided with the optical position detection apparatus, which enables the light having a light intensity that corresponds to a light emitting intensity in a light source unit to be incident to a light receiving unit as a default light and can appropriately perform initial setting of the relationship between a drive current in the light source unit and the light intensity in the light receiving unit based on the result of receiving the default light.

An aspect of the invention is directed to an optical position detection apparatus optically detecting the position of a target object, which includes a light source unit emitting a detection light; a light receiving unit receiving the detection light that is reflected by the target object located in an emission space of the detection light; a position detection unit detecting the position of the target object in the emission space based on the result of the light reception in the light receiving unit when the light source unit is turned on; and a reflection unit for generating a default light that reflects a part of the detection light emitted from the light source unit and makes the reflected light be incident to the light receiving unit as the default light in a case where the target object is not present in the emission space. In the aspect of the invention, the "default light" means light that the light receiving unit receives in a state where the target object is not present when the optical position detection apparatus starts its operation, and in the aspect of the invention, even the light that is incident to the light receiving unit in place of the above-described light is considered as the "default light".

According to the aspect of the present invention, when the light source unit is turned on, the result of the light reception in the light receiving unit corresponds to a distance from the light source unit to the light receiving unit through the target object or intensity distribution that is formed by the detection light emitted from the light source unit. Accordingly, the position of the target object can be detected by directly using the result of the detection in the light receiving unit or using the drive current when making differential of the light source units based on the result of the light reception in the light receiving unit. Further, according to the aspect of the invention, the reflection unit for generating the default light is installed, and when the light source unit is turned on in a case where the target object is not present, a part of the detection light emitted from the light source unit is reflected by the reflection unit for generating the default light and is incident to the light receiving unit as the default light regardless of the position relationship between the light source unit and the light receiving unit. Because of this, it is possible to initially set the relationship between the drive current in the light source unit and the light intensity in the light receiving unit based on the light intensity of the default light in the light receiving unit. Accordingly, an appropriate condition can be constantly set with respect to the relationship between the drive current in the light source unit and the light intensity in the light receiving unit, and thus the position of the target object can be detected with high accuracy.

In the aspect of the present invention, it is preferable that the optical position detection apparatus further includes a housing that covers the light source unit and the light receiving unit, and the reflection unit for generating the default light is configured by a front-side housing portion that is located on the light emission side of the light source unit in the housing. According to this configuration, the reflection unit for generating the default light can be configured using a part of the housing. Accordingly, it is not required to additionally provide a new member, and thus the simplification of the configuration can be sought.

In the aspect of the present invention, it is preferable that the reflection unit for generating the default light has a higher reflection rate than that in a portion other than the portion which forms the reflection unit for generating the default light in the front-side housing portion. According to this configuration, even if the detection light reaches a portion other than the reflection unit for generating the default light in the front-side housing portion, the corresponding portion has a low reflection rate, and thus a part of the detection light becomes stray light to prevent the detection light from leaking to the emission space of the detection light.

Another aspect of the invention is directed to an optical position detection apparatus optically detecting the position of a target object, which includes a light source unit emitting a detection light; a light receiving unit receiving the detection light that is reflected by the target object located in an emission space of the detection light; a position detection unit detecting the position of the target object in the emission space based on the result of the light reception in the light receiving unit when the light source unit is turned on; and a light source unit for generating a default light that emits light in conjunction with the light source unit and makes the emitted light be incident to the light receiving unit as the default light in a case where the target object is not present in the emission space.

According to the aspect of the present invention, when the light source unit is turned on, the result of the light reception in the light receiving unit corresponds to a distance from the light source unit to the light receiving unit through the target object or intensity distribution that is formed by the detection light emitted from the light source unit. Accordingly, the position of the target object can be detected by directly using the result of the detection in the light receiving unit or using the drive current when making differential of the light source units based on the result of the light reception in the light receiving unit. Further, according to the aspect of the invention, the light source unit for generating the default light is installed, and when the light source unit is turned on in a case where the target object is not present, the light source for generating the default light is also turned on, and the default light is incident to the light receiving unit. Accordingly, it is possible to initially set the relationship between the drive current in the light source unit and the light intensity in the light receiving unit based on the light intensity of the default light in the light receiving unit. Accordingly, an appropriate condition can be constantly set with respect to the relationship between the drive current in the light source unit and the light intensity in the light receiving unit, and thus the position of the target object can be detected with high accuracy.

In the aspect of the present invention, it is preferable that a light source of the light source unit for generating the default light be electrically connected to a light source that is used in the light source unit in parallel or in series. According to this configuration, it is possible to turn on the light source for generating the default light in conjunction with the light source unit.

In the aspect of the present invention, it is preferable that a plurality of light source units be installed, and the position detection unit detect the position of the target object based on a result of comparing drive conditions when parts of the light source units are driven so that the light intensity in the light receiving unit when the parts of the light source units are turned on becomes equal to the light intensity in the light receiving unit when other parts of the light source units are turned on among the plurality of light sources. Using the above-described differential, the influence of ambient light or the like can be automatically corrected. In a case of making differential as described above, it may be possible to directly make differential of the parts of the light source units and the other parts of the light source units. In addition, the position of the target object may be detected by installing a reference light source emitting a reference light that is incident to the light receiving unit without passing through the emission space, making differential of the parts of the light source units and the reference light source with making differential of the other parts of the light source units and the reference light source, comparing the results of the differentials, and comparing the comparison result with the comparison result of the drive conditions when the light source units are driven.

The optical position detection apparatus according to the present invention may be used in an appliance having a position detection function provided with a visible surface configuration member having a visible surface. In this case, any one of a configuration where the detection light is emitted along the visible surface and a configuration where the detection light is emitted to transmit the visible surface may be adopted.

In the aspect of the present invention, as the visible surface configuration member, a direct-view image generation device that displays an image may be used, and in this case, the visible surface may be an image display surface in which the image is displayed in the direct-view image generation device. According to this configuration, the appliance having the position detection function may include a direct-view display device having a position detection function.

In the aspect of the present invention, as the visible surface configuration member, a screen on which information is visible may be used, and in this case, the visible surface may be a screen surface on which the information is visible. In the screen, according to this configuration, the appliance having the position detection function may include a position detection function equipped screen device.

In the aspect of the present invention, as the visible surface configuration member, a light transmissive member for covering an exhibit may be used. In this case, the visible surface is a surface on which the corresponding exhibit is visible on the opposite side to the side where the exhibit is arranged in the visible surface configuration member. According to this configuration, the appliance having the position detection function may include a show window or the like having the position detection function.

In the aspect of the present invention, as the visible surface configuration member, a configuration having a base that supports a moving medium for a game may be adopted, and in this case, the visible surface is a surface on the side where the medium for a game is visible in the base. According to this configuration, the appliance having the position detection function may include an amusement appliance such as a pachinko (Japanese pinball) machine and a coin game.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the accompanying drawings. In the following description, it is assumed that axes crossing one another in opposite directions are X-axis, Y-axis, and Z-axis, and an emission direction of detection light is a Z-axis direction. Accordingly, according to an embodiment of the invention, a "first direction" is a Z-axis direction, a "second direction" crossing the "first direction" is an X-axis direction. Further, in the following reference drawings, it is assumed that one side in the X-axis direction is an X1 side, the other side therein is X2 side, one side in the Y-axis direction is a Y1 side, the other side therein is Y2 side, one side in the Z-axis direction is a Z1 side, and the other side therein is Z2 side.

Embodiment 1

Entire Configuration

Figure 1:
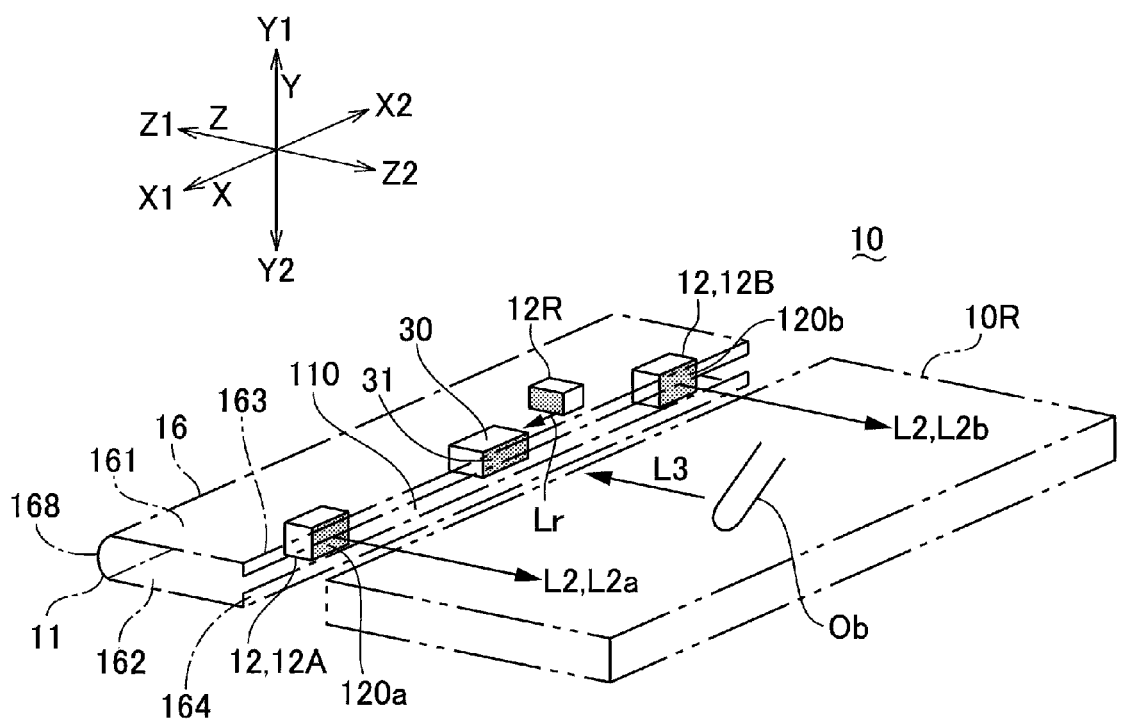
FIG. 1 is an explanatory view schematically illustrating a main portion of an optical position detection apparatus according to embodiment 1 of the invention.
Figure 2A:
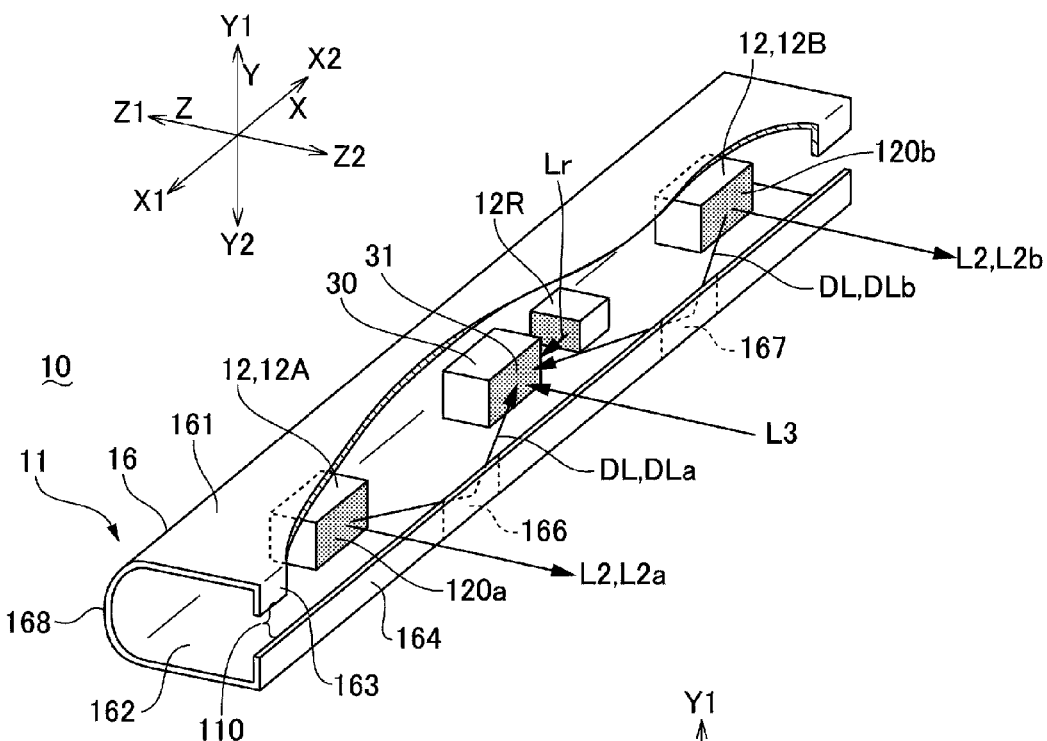
FIGS. 2A to 2C are explanatory views of an optical unit of an optical position detection apparatus according to embodiment 1 of the invention.
Figure 2B:
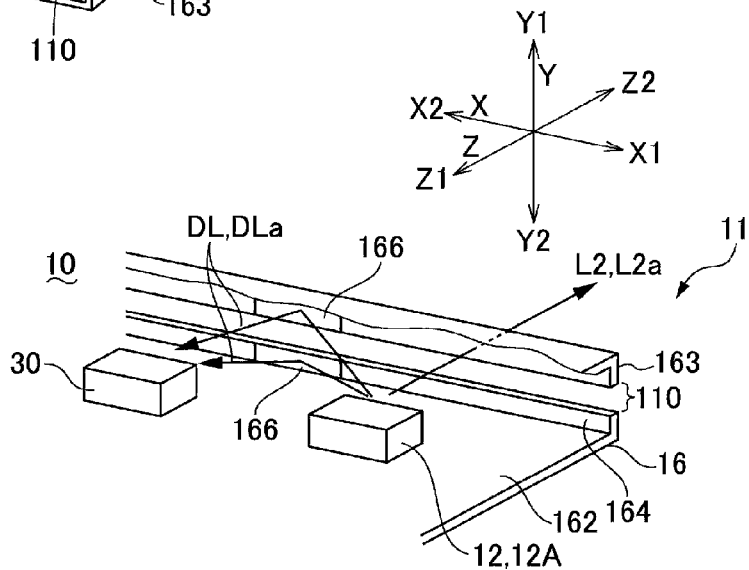
Figure 2C:
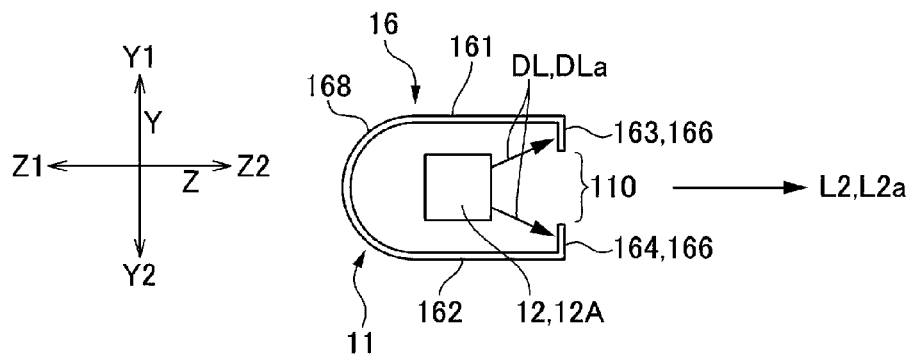

FIG. 1 is an explanatory view schematically illustrating a main portion of an optical position detection apparatus according to embodiment 1 of the invention. FIGS. 2A to 2C are explanatory views of an optical unit of an optical position detection apparatus according to embodiment 1 of the invention, in which FIG. 2A is a perspective view illustrating a housing of an optical unit of which a portion is cut off, FIG. 2B is an explanatory view seen on one side in the Z-axis direction, and FIG. 2C is an XY cross-sectional view.

In FIGS. 1 and 2A to 2C, the optical position detection apparatus 10 according to this embodiment includes an optical unit 11 having a light emission surface 110 that emits a detection light L2 from one side Z1 in the Z-axis direction (first direction) to the other side Z2. This optical unit 11 includes a plurality of light source units 12 that emit the detection light L2 from one side Z1 in the Z-axis direction to the other side Z2, a light receiving unit 30 detecting a detection light L3 reflected from the target object Ob, and a housing 16 maintaining the plurality of light source units 12 and the light receiving unit 30 therein. The optical unit 11 is provided with two or more light source units as the plurality of light source units 12. In this embodiment, the two light source units 12 include a first light source unit 12A and a second light source unit 12B which is installed in a position that is apart from the first light source unit 12A in the X-axis direction (the second direction) crossing the Z-axis direction.

In this embodiment, all the first light source unit 12A and the second light source unit 12B have light sources 120a and 120b having light emission portions which are directed toward the other side Z2 in the Z-axis direction, and the optical axes of the first light source unit 12A and the second light source unit 12B are parallel with each other. Further, the first light source unit 12A and the second light source unit 12B are arranged in the same position in the Z-axis direction. The first light source unit 12A and the second light source unit 12B emit detection lights L2a and L2b, respectively, as the detection light L2. In this embodiment, a detection space 10R in which the position of the target object Ob is detected is formed by an emission space of the detection light L2 as described above.

In this embodiment, the light sources 120a and 120b used in the light source unit 12 (the first light source unit 12A and the second light source unit 12B) are configured by light emitting elements such as LED (Light Emitting Diodes), and the light sources 120a and 120b emit the detection light L2 (detection lights L2a and L2b) which is composed of infrared light having a peak wavelength of 840 to 1000 nm as a diverging light. In this embodiment, since the target object Ob is a finger end or the like in many cases, infrared light (near infrared light of about 840 to 920 nm) of a wavelength region having a high reflection rate on the target object Ob (human body) is used as the detection light L2.

The light receiving unit 30 is composed of a photodiode or a phototransistor that is directed toward a light receiving surface 31 of the other side Z2 in the Z-axis direction, and in this embodiment, the light receiving unit 30 is a photodiode having a peak sensitivity of an infrared region. In this embodiment, the light receiving unit 30 is arranged approximately in the center position between the first light source unit 12A and the second light source unit 12B in the X-axis direction, and is arranged approximately in the same position as the first light source unit 12A and the second light source unit 12B in the Z-axis direction.

Further, the optical unit 11 also includes a reference light source 12R that is directed toward the light emission portion in the light receiving unit 30. In the same manner as the light source unit 12, the reference light source 12R is configured by light emitting elements such as LED (Light Emitting Diodes), and the reference light source 12R emits the reference light Lr which is composed of infrared light having a peak wavelength of 840 to 1000 nm as a diverging light. However, the reference light source 12R is configured such that the reference light Lr emitted from the reference light source 12R is not incident to the side of the visible surface 41 (detection space 10R) of the visible surface configuration member 40, but is incident to the light receiving unit 30 without passing through the detection space 10R by adjusting the direction of the reference light source 12R or providing a shield cover (not illustrated) installed on the reference light source 12R.

Configuration of a Reflection Unit for Generating a Default Light

In the optical unit 11, the housing 16 includes side plate portions 161 and 162 that cover the light source unit 12, the light receiving unit 30, and the reference light source 12R on both sides in the Y-axis direction, and a rear-side housing portion 168 having a U-shaped cross section that connects the sides Z1 of the side plate portions 161 and 162 in the Z-axis direction. The side plate portions 161 and 162 are spaced apart for a predetermined dimension to face each other in the Y-axis direction, and by an open portion that is formed on the other side Z2 in the Z-axis direction between the side plate portions 161 and 162, a light emission surface 110 of the optical unit 11 is formed to perform emission of the detection light L2 from the light source unit 12 to the detection space 10R and reception of the detection light L3 from the detection space 10R to the light receiving unit 30.

Further, the housing 16 includes a front-side housing portion 163 that is bent from the end portion of the other side Z2 in the Z-axis direction of the side plate portion 161 to the side plate portion 162, and a front-side housing portion 164 that is bent from the end portion of the other side Z2 in the Z-axis direction of the side plate portion 162 to the side plate portion 161. In this embodiment, the dimension (width dimension) in the Y-axis direction of the front-side housing portions 163 and 164 is smaller than the facing distance of the side plate portions 161 and 162. Due to this, in this embodiment, the light emission surface 110 of the optical unit 11 is formed between the front-side housing portions 163 and 164.

Here, the front-side housing portions 163 and 164 have a width dimension in which a part of the detection light L2 emitted from the light source unit 12 is irradiated. Due to this, apart of the detection light L2 emitted from the light source unit 12 is reflected from the inner surfaces of the front-side housing portions 163 and 164, and a part thereof is not emitted to the detection space 10R, but proceeds in the X-axis direction and is incident to the light receiving unit 30.

As described above, in this embodiment, the parts of the front-side housing portions 163 and 164 form reflection units 166 and 167 for generating a default light which reflect the part of the detection light L2 emitted from the light source unit 12 and make the reflected light be incident to the light receiving unit 30 in the detection space 10R (emission space) as the default light DL. According to the reflection units 166 and 167 for generating a default light, if the first light source unit 12A and the second light source unit 12B are turned on and the detection lights L2a and L2b are emitted, parts of the detection lights L2a and L2b are incident as the default lights DLa and DLb regardless of whether the target object Ob is present in the detection space 10R.

In this embodiment, the housing 16 is formed of a metal plate such as aluminum or stainless steel. Further, the portions that are used as the reflection units 166 and 167 for generating a default light of the front-side housing portions 163 and 164 are specified portions that are prescribed by the position relationship between the light source unit 12 and the light receiving unit 30. Due to this, in the housing 16, the portions that are used as the reflection units 166 and 167 for generating the default light are portions in which processing such as polishing has been performed or portions to which a sheet having a high reflectivity is attached, and the reflection units 166 and 167 for generating the default light have a higher reflection rate than that of a portion other than the portions that are used as the reflection units 166 and 167 for generating the default light in the housing 16.

Configuration of a Position Detection Unit or the Like

Figure 3:
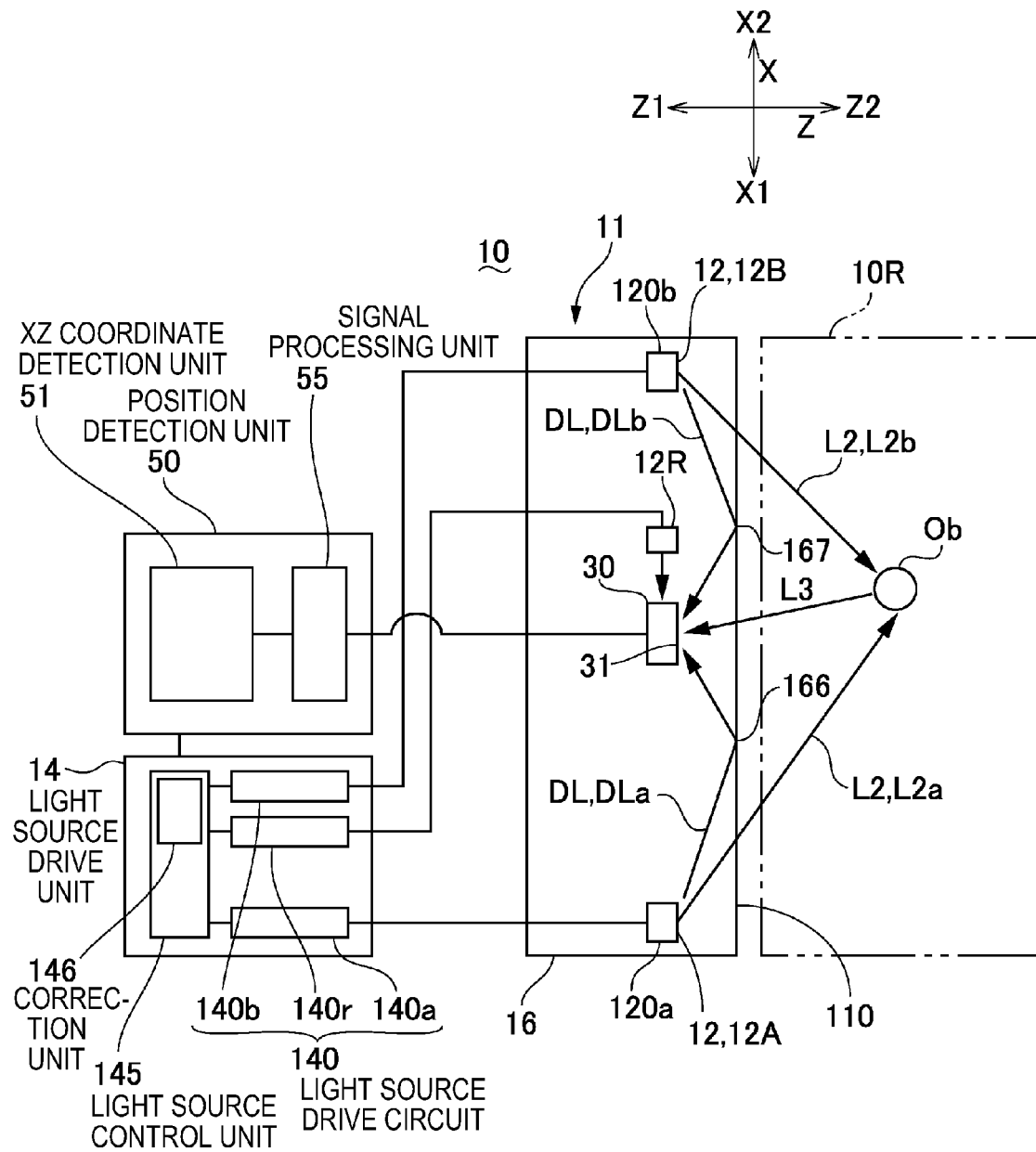
FIG. 3 is an explanatory diagram illustrating the entire configuration of an optical position detection apparatus according to embodiment 1 of the invention.

FIG. 3 is an explanatory diagram illustrating the entire configuration of an optical position detection apparatus 10 according to embodiment 1 of the invention. As illustrated in FIG. 3, the optical position detection apparatus 10 includes a light source drive unit 14 that drives a plurality of light source units 12 and a reference light source 12R. The light source drive unit 14 includes a light source drive circuit 140 driving the light source unit 12 and the reference light source 12R and a light source control unit 145 controlling turning on the plurality of light source units 12 through the light source drive circuit 140. The light source driving circuit 140 includes light source drive circuits 140a, 140b, and 140r driving the first light source unit 12A, the second light source unit 12B, and the reference light source 12R, and the light source control unit 145 controls all the light source drive circuits 140a, 140b, and 140r.

The light receiving unit 30 is electrically connected to a position detection unit 50, and the light receiving unit 30 outputs the result of the detection to the position detection unit 50. The position detection unit 50 includes a signal processing unit 55 (signal processing circuit) for performing signal process for detecting the position of the target object Ob based on the result of the detection in the light receiving unit 30, and the signal processing unit 55 includes an amplifier, a comparator, and the like. Further, the position detection unit 50 includes an XZ coordinate detection unit 51 detecting the position in the X-axis direction and the position in the Z-axis direction of the target object Ob in the detection space 10R (emission space) based on the result of the light reception in the light receiving unit 30 when the plurality of light source units 12 are turned on.

Further, in this embodiment, the light source control unit 145 includes a correction unit 146 for correcting the relationship between the drive current of the light sources 120*a* and 120*b* of the first light source unit 12A and the second light source unit 12B and the light intensity in the light receiving unit 30 during an initial setting before the optical position detection apparatus 10 is shipped or during an initial setting whenever the optical position detection apparatus 10 starts.

The position detection unit 50 and the light source drive unit 14 as configured above operate in conjunction with each other, and perform position detection to be described later. In the position detection unit 50, a microprocessor unit (MPU) is used as the XZ coordinate detection unit 51, and thus a configuration that performs the process according to execution of predetermined software (operation program) may be adopted.

Correction/Initial Setting of Drive Current and Emission Intensity (Light Intensity)

In the optical position detection unit 10 according to this embodiment in FIGS. 1 to 3, as described in detail later, the position of the target object Ob in the detection space 10R is detected based on the result of the light reception in the light receiving unit 30 when the light source unit 12 (the first light source unit 12A and the second light source unit 12B) is turned on. Accordingly, during an initial setting before the optical position detection apparatus 10 is shipped or during an initial setting whenever the optical position detection apparatus 10 starts, the first light source unit 12A and the second light source unit 12B are sequentially turned on in a state where the target object Ob is not present, and the correction unit 146 corrects the relationship between the drive current and the light intensity based on the result of the detection in the light receiving unit 30.

At that time, although the first light source unit 12A and the second light source unit 12B are directed to the same direction as the light receiving unit 30, in this embodiment, the parts of the front-side housing portions 163 and 164 form the reflection units 166 and 167 for generating the default light which reflect the part of the detection light L2 emitted from the light source unit 12 and make the reflected light be incident to the light receiving unit 30 in the detection space 10R (emission space) as the default light DL. Accordingly, when the first light source unit 12A and the second light unit 12B are sequentially turned on, the default lights DLa and DLb having intensities corresponding to the detection lights L2*a* and L2*b* emitted from the first light source unit 12A and the second light source unit 12B are incident to the light receiving unit 30 even in a state where the target object Ob is not present. Accordingly, the correction unit 146 corrects the drive current so that the first light source unit 12A and the second light source unit 12B emit the detection lights L2*a* and L2*b* having the predetermined intensity based on the light intensities in the light receiving unit 30 with respect to the default lights DLa and DLb, and controls the light source drive circuit 140 based on the result of the correction.

Principle for Detecting Coordinates

In the optical position detection apparatus 10 in this embodiment, the position detection unit 50 acquires information in the X-axis direction of the target object Ob in the detection space 10R based on the result of the light reception in the light receiving unit 30 when the plurality of light source units 12 (the first light source unit 12A and the second light source unit 12B), which are spaced apart from each other in the X-axis direction, are sequentially turned on. Further, the position detection unit 50 acquires information in the Z-axis direction of the target object Ob in the detection space 10R based on the result of the light reception in the light receiving unit 30 when all the plurality of light source units 12 (the first light source unit 12A and the second light source unit 12B) are turned on. Further, the position detection unit 50 detects the XZ coordinates of the target object Ob based on the information in the X-axis direction and the information in the Y-axis direction of the target object Ob.

More specifically, in acquiring the information in the X-axis direction of the target object Ob, the light source drive unit 14 turns on the first light source unit 12A, but turns off the second light source unit 12B. Further, the light source drive unit 14 turns off the first light source unit 12A, but turns on the second light source unit 12B. Accordingly, if the target object Ob is arranged in the detection space 10R, the detection light L2 is reflected by the target object Ob, and a part of the reflected light is detected by the light receiving unit 30. At that time, the light intensity in the light receiving unit 30 has a value that corresponds to the position in the X-axis direction of the target object Ob. Accordingly, by using the ratio of the drive current when the control amount (drive current) of the first light source unit 12A is adjusted to the drive current when the control amount (drive current) of the second light source unit 12B is adjusted and the ratio of the adjustment amounts so that the light intensity of the light receiving unit 30 when the first light source unit 12A is turned on becomes equal to the light intensity of the light receiving unit 30 when the second light source unit 12B is turned on, a geometric line that is based on the first light source unit 12A and the second light source 12B in the XZ plane can be set, and the target object Ob is positioned on such a geometric line.

Further, in acquiring the information in the Z-axis direction of the target object Ob, the light source drive unit 14 turns on both the first light source unit 12A and the second light source unit 12B. Accordingly, if the target object Ob is arranged in the detection space 10R, the detection light L2 is reflected by the target object Ob, and a part of the reflected light is detected by the light receiving unit 30. At that time, the light intensity in the light receiving unit 30 becomes a value that corresponds to the position of the target object Ob in the Z-axis direction. Because of this, by using the drive current value or the like when the control amount (drive current) of the first light source unit 12A and the second light source unit 12B is adjusted so that the light intensity of the light receiving unit 30 when both the first light source unit 12A and the second light source unit 12B are turned on becomes a predetermined value, a line can be set based on the first light source unit 12A and the second light source unit 12B in the XZ plane, and the target object Ob is positioned on such a set line.

Accordingly, by obtaining an intersection point of the geometric line obtained when the first light source unit 12B and the second light source unit 12C are sequentially turned on and the line obtained when the first light source unit 12A and the third light source unit 12C are simultaneously turned on, the position (XZ coordinates) of the target object Ob can be obtained.

Concrete Principle of Detecting Coordinates

Figure 4A:
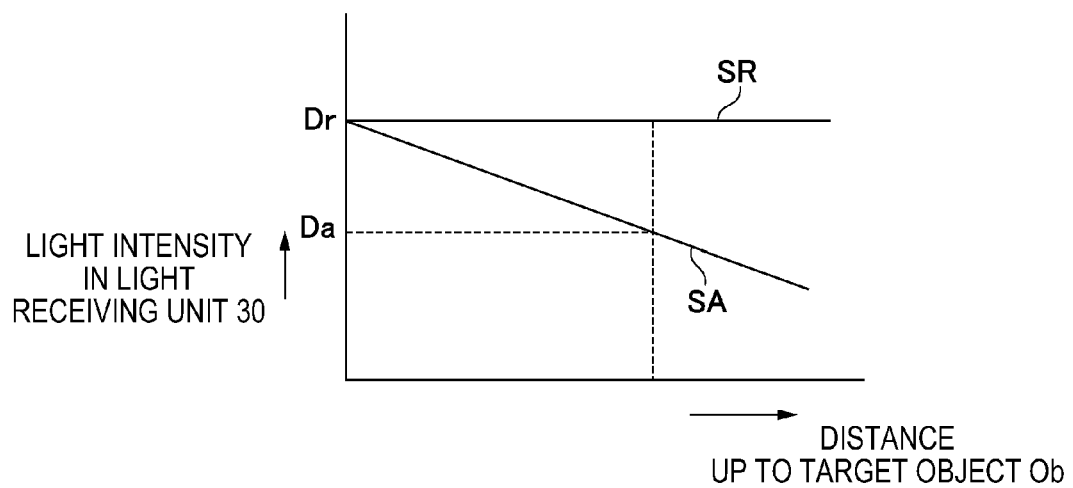
FIGS. 4A and 4B are explanatory diagrams illustrating the principle of detecting the position of a target object using differential of a detection light and a reference light in an optical position detection apparatus according to embodiment 1 of the invention.
Figure 4B:
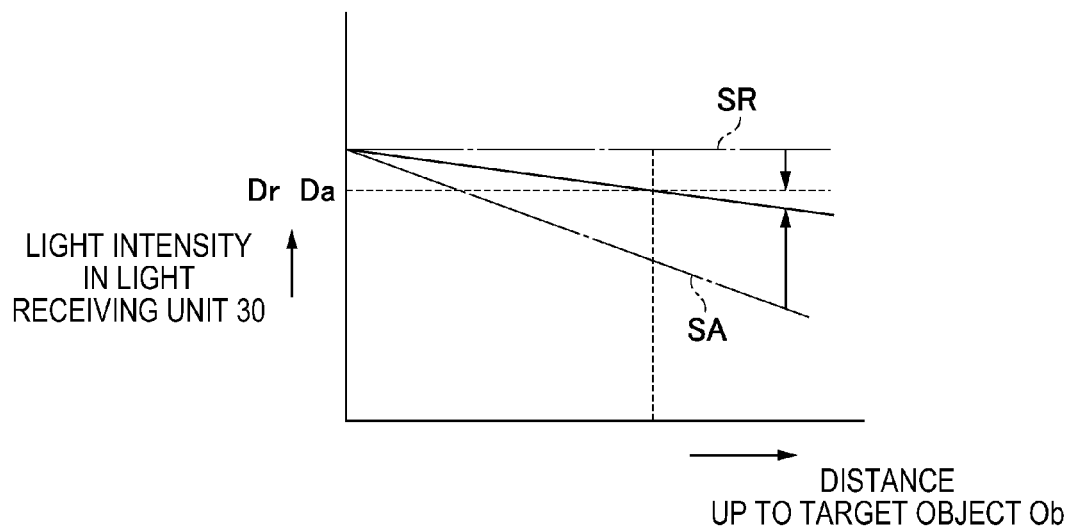

FIGS. 4A and 4B are explanatory diagrams illustrating the principle of detecting the position of a target object Ob using differential of a detection light L2 and a reference light Lr in an optical position detection apparatus 10 according to embodiment 1 of the invention, in which FIG. 4A is an explanatory diagram illustrating the relationship between the distance from the light source unit 12 to the target object Ob and the light intensity of the detection light L2 or the like, and FIG. 4B is an explanatory diagram illustrating a state after the drive current of the light source is adjusted.

In this embodiment, the optical position detection unit 10 uses the differential of the detection light L2 and the reference light Lr, instead of a direct differential or the like between the detection lights, when it obtains information in the X-axis direction of the target object Ob. Here, the differential between the detection light L2a and the reference light Lr and the differential between the detection light L2c and the reference light Lr are executed as follows.

As illustrated in FIG. 4A, in a state where the target object Ob is present in the detection space 10R, the distance from the first light source unit 12A to the light receiving unit 30 through the target object Ob and the light intensity $D_a$ of the detection light L2a in the light receiving unit 30 change monotonically as indicated by a solid line SA. By contrast, the detected intensity of the light receiving unit 30 of the reference light Lr emitted from the reference light source 12R, as indicated by a solid line SR, is constant regardless of the position of the target object Ob. Accordingly, the light intensity $D_a$ of the detection light L2a in the light receiving unit 30 is different from the detected intensity $D_r$ of the reference light Lr in the light receiving unit 30.

Next, by adjusting at least one of the drive current of the first light source unit 12A and the drive current of the reference light source 12R, the light intensity $D_a$ of the detection light L2a in the light receiving unit 30 coincides with the detected intensity $D_r$ of the reference light Lr in the light receiving unit 30. This differential is performed between the reference light Lr and the detection light L2a and between the reference light Lr and the detection light L2b when the information of the target object Ob in the X-axis direction is obtained. Accordingly, the ratio of the drive current of the first light source unit 12A to the drive current of the second light source unit 12B at a time point where the detection result of the detection lights L2a and L2b in the light receiving unit 30 becomes equal to the detection result of the reference light Lr in the light receiving unit 30 can be obtained, and based on this ratio, information in the X-axis direction can be obtained.

Further, in obtaining information in the Z-axis direction of the target object Ob, the first light source unit 12A and the second light source unit 12B are simultaneously turned on in order to use the differential between the detection light L2 and the reference light Lr. Further, at least one of the drive current of the light source unit 12 (the first light source unit 12A and the second light source unit 12B) and the drive current of the reference light source 12R is adjusted so that the detected intensity in the light receiving unit 30 when the first light source unit 12A and the second light source unit 12B are simultaneously turned on becomes equal to the detected intensity of the reference light Lr emitted from the reference light source 12R in the light receiving unit 30. Accordingly, the ratio of the drive current of the light source unit 12 (the first light source unit 12A and the second light source unit 12B) to the drive current of the reference light source 12R at a time point where the detected intensity of the detection light L2 (L2a and L2b) in the light receiving unit 30 becomes equal to the detected intensity of the reference light Lr in the light receiving unit 30 can be obtained, and based on this ratio, information in the Z-axis direction can be obtained.

Main Effect of this Embodiment

As described above, according to the optical position detection apparatus 10 in this embodiment, the result of the light reception in the light receiving unit 30 corresponds to the distance from the light source unit 12 to the light receiving unit 30 through the target object Ob when the light receiving unit 12 is turned on. Accordingly, by using the detection result in the light receiving unit 30, the drive current when the differential between the light source units 12 is executed based on the result of the light reception in the light receiving unit 30, and the drive current when the differential between the light source unit 12 and the reference light source 12R is executed based on the result of the light reception in the light receiving unit 30, the position of the target object Ob can be detected.

Further, in this embodiment, the reflection units 166 and 167 for generating the default light are installed, and when the light source unit 12 is turned on in a case where the target object Ob is not present, parts of the detection light L2 emitted from the light source unit 12 are reflected by the reflection units 166 and 167 for generating the default light, and then are incident to the light receiving unit 30 as the default lights DLa and DLb regardless of the position relationship between the light source unit 12 and the light receiving unit 30. Accordingly, in the optical position detection apparatus 10, before the optical position detection apparatus 10 is shipped or whenever a user operates the optical position detection apparatus 10, a predetermined drive current is sequentially supplied to the first light source unit 12A and the second light source unit 12B in a case where the target object Ob is not present, and an actual relationship between the drive current of the light source unit 12 (the first light source unit 12A and the second light source unit 12B) and the light intensity in the light receiving unit 30 is grasped on the basis of the light intensity of the default light DLa and the light intensity of the default light DLb in the light receiving unit 30 when the first light source unit 12A and the second light source unit 12B are sequentially turned on. Then, correction data regarding the relationship between the drive current of the first light source unit 12A and the second light source unit 12B and the light intensity in the light receiving unit 30 is generated, and such correction data is stored in the correction unit 146 as processed setting value. Accordingly, in the optical position detection apparatus 10 in the embodiment, the relationship between the drive current in the light source unit 12 and the light intensity in the light receiving unit 30 can be constantly set on appropriate conditions, and thus the position of the target object Ob can be detected with high accuracy.

Further, in this embodiment, the optical unit 11 includes the housing 16 that covers the light source unit 12 and the light receiving unit 30, and the reflection units 166 and 167 for generating the default light are formed by the front-side housing portions 163 and 164 which are positioned on the light emission side of the light source unit 12 in the housing 16. Accordingly, the reflection units 166 and 167 for generating the default light can be configured using parts of the housing 16, and it is not necessary to separately add a new member to simplify the configuration.

Further, the reflection units 166 and 167 for generating the default light have a higher reflection rate than that of a portion other than the portions that form the reflection units 166 and 167 for generating the default light in the front-side housing portions 163 and 164. Due to this, even if the detection light reaches a portion other than the reflection units 166 and 167 for generating the default light in the front-side housing portions 163 and 164, the corresponding portion has a low reflection rate, and thus a part of the detection light L2 becomes stray light to prevent the detection light L2 from leaking to the detection space 10R of the detection light L2.

Further, in this embodiment, since the differential between the light source units 12 or the differential between the light source unit 12 and the reference light source 12R is used, the influence of ambient light or the like can be automatically corrected.

Further, since the detection light L2 is an infrared light, it is not visible. Accordingly, in a case of displaying information on an appliance on which the optical position detection apparatus 10 in this embodiment is mounted, the detection light does not disturb the visibility of the information.

Further, in this embodiment, the front-side housing portions 163 and 164 are formed over the whole X-axis direction. However, it is also possible to adopt a configuration in which the front-side housing portions 163 and 164 are intermittently notched so that only portions that correspond to the reflection units 166 and 167 for generating the default light remain.

Embodiment 2

Figure 5:
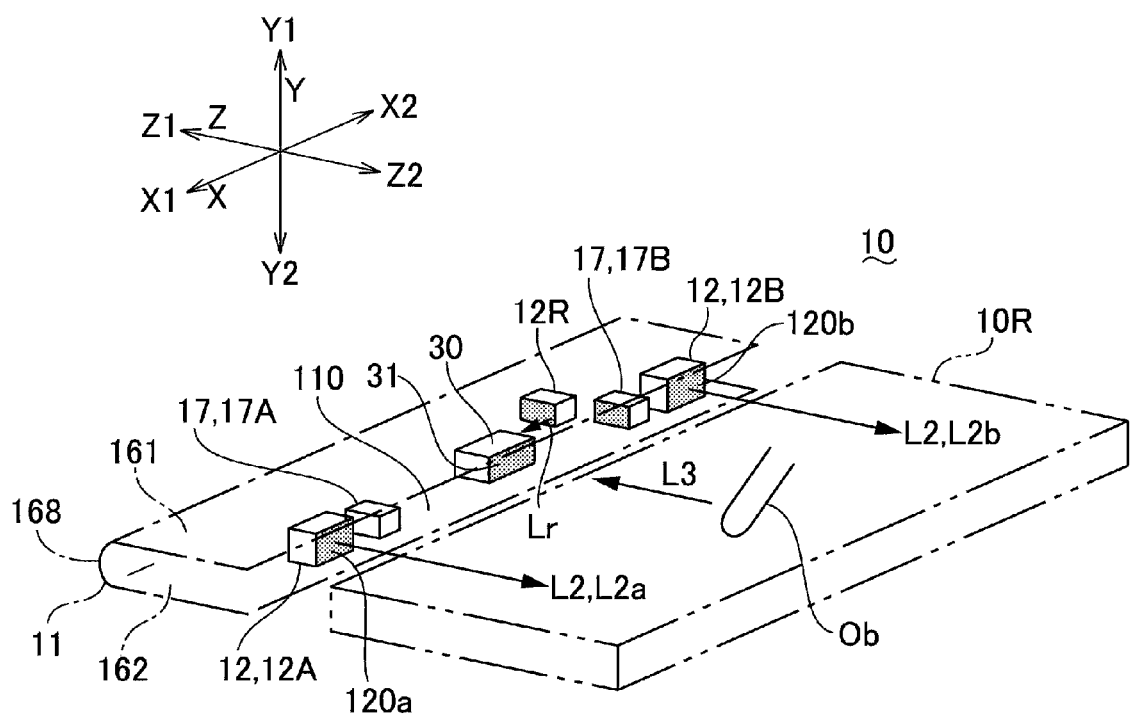
FIG. 5 is an explanatory view schematically illustrating a main portion of an optical position detection apparatus according to embodiment 2 of the invention.
Figure 6:
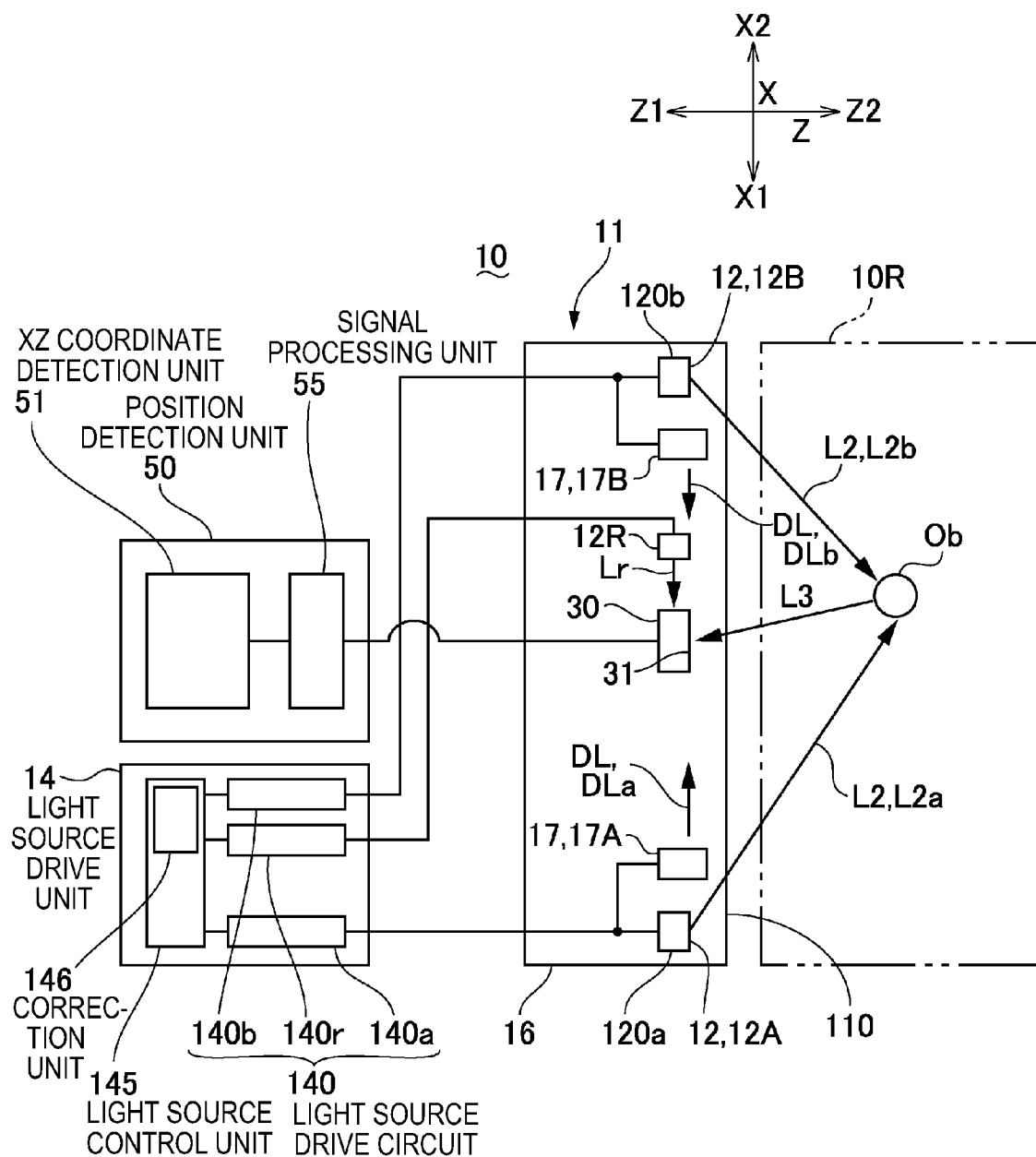
FIG. 6 is an explanatory diagram of an optical unit of an optical position detection apparatus according to embodiment 2 of the invention.
Figure 7:
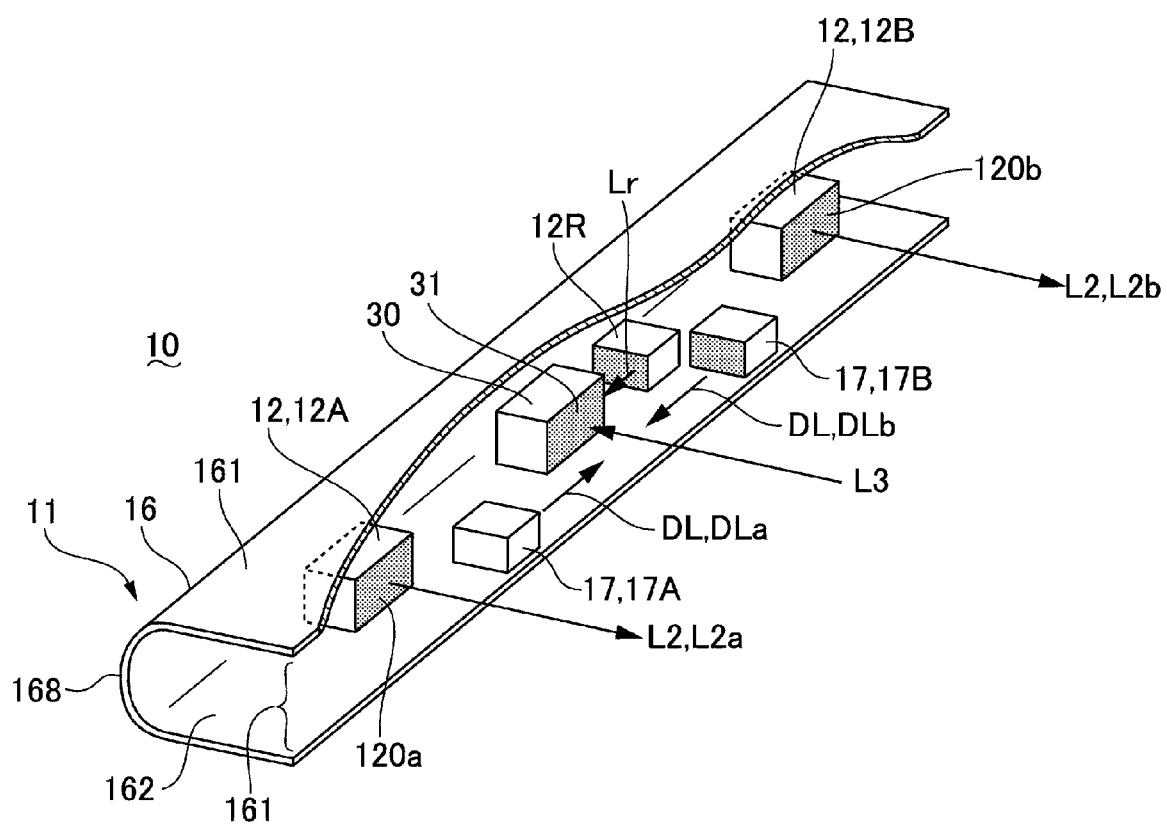
FIG. 7 is an explanatory view illustrating the entire configuration of an optical position detection apparatus according to embodiment 2 of the invention.

FIG. 5 is an explanatory view schematically illustrating a main portion of an optical position detection apparatus according to embodiment 2 of the invention. FIG. 6 is an explanatory diagram of an optical unit of an optical position detection apparatus according to embodiment 2 of the invention. FIG. 7 is an explanatory view illustrating the entire configuration of an optical position detection apparatus according to embodiment 2 of the invention. Since the basic configuration in this embodiment is the same as that in embodiment 1, the same reference numerals are used for the common portions, and the description thereof will be omitted.

As illustrated in FIGS. 5 and 6, in the same manner as embodiment 1, the optical position detection apparatus 10 according to this embodiment includes an optical unit 11 having a light emission surface 110 that emits a detection light L2 from one side Z1 in the Z-axis direction (first direction) to the other side Z2. This optical unit 11 includes a plurality of light source units 12 that emit the detection light L2 from one side Z1 in the Z-axis direction to the other side Z2, a light receiving unit 30 detecting a detection light L3 reflected from the target object Ob, and a housing 16 covering the light source unit 12 and the light receiving unit 30. As the plurality of light source units 12, the optical unit 11 is provided with a first light source unit 12A and a second light source unit 12B which is installed in a position that is spaced apart from the first light source unit 12A in the X-axis direction (the second direction) crossing the Z-axis direction. Further, the optical unit 11 is provided with a reference light source 12R that is directed toward a light emission unit in the light receiving unit 30, and a reference light Lr that is emitted from the reference light source 12R is incident to the light receiving unit 30 without passing through a detection space 10R.

In the optical unit 11, the housing 16 includes side plate portions 161 and 162 that cover the light source unit 12, the light receiving unit 30, and the reference light source 12R on both sides in the Y-axis direction, and a rear-side housing portion having a U-shaped cross section that connects the sides Z1 of the side plate portions 161 and 162 in the Z-axis direction. The side plate portions 161 and 162 are spaced apart for a predetermined dimension to face each other in the Y-axis direction, and by an open portion that is formed on the other side Z2 in the Z-axis direction between the side plate portions 161 and 162, a light emission surface 110 of the optical unit 11 is formed to perform emission of the detection light L2 from the light source unit 12 to the detection space 10R and reception of the detection light L3 from the detection space 10R to the light receiving unit 30.

In the optical position detection apparatus 10 according to this embodiment, the optical unit 11 is provided with a light source 17 for generating a default light that is provided inside the housing 16 to be directed to the light emission portion in the light receiving unit 30. The light source 17 for generating a default light includes a light source 17A for generating a default light that is adjacent to a side where the light receiving unit 30 is positioned with respect to the first light source unit 12A and a light source 17B for generating a default light that is adjacent to a side where the light receiving unit 30 is positioned with respect to the second light source unit 12B. Here, the light source 17A for generating the default light is composed of a light emission element that is electrically connected to a light source 120a of the first light source unit 12A in series or in parallel, and is turned on in conjunction with the first light source unit 12A. The light source 17B for generating the default light is composed of a light emission element that is electrically connected to a light source 120b of the second light source unit 12B in series or in parallel, and is turned on in conjunction with the second light source unit 12B. Further, the light emission elements used in the light sources 17A and 17B for generating the default light are composed of light emitting diodes that emit infrared light in the same manner as the light sources 120a and 120b used in the first light source unit 12A and the second light source unit 12B.

In the optical position detection apparatus 10 as configured above, current which is in conjunction with the drive current supplied to the first light source unit 12A by the light source drive circuit 140a is supplied to the light source 17A for generating the default light, and current which is in conjunction with the drive current supplied to the second light source unit 12B by the light source drive circuit 140b is supplied to the light source 17B for generating the default light. Accordingly, if the first light source unit 12A and the second light source unit 12B are sequentially turned on in a state where the target object Ob is not present during an initial setting of the optical position detection apparatus 10 or whenever the optical position detection apparatus 10 starts, the light sources 17A and 17B for generating the default light are sequentially turned on. Accordingly, when the first light source unit 12A and the second light source unit 12B, which are directed to the same direction as the light receiving unit 30, are sequentially turned on, the default lights DLa and DLb having intensities corresponding to the detection lights L2a and L2b emitted from the first light source unit 12A and the second light source unit 12B are incident to the light receiving unit 30 even in a state where the target object Ob is not present. Accordingly, the correction unit 146 corrects the drive current so that the first light source unit 12A and the second light source unit 12B emit the detection lights L2a and L2b having the predetermined intensity based on the light intensities in the light receiving unit 30 with respect to the default lights DLa and DLb, and controls the light source drive circuit 140 based on the result of the correction.

Embodiment 3

According to this embodiment, a light source unit having a configuration to be described hereinafter can be adopted instead of the light source unit as described above in embodiments 1 and 2.

Figure 8A:
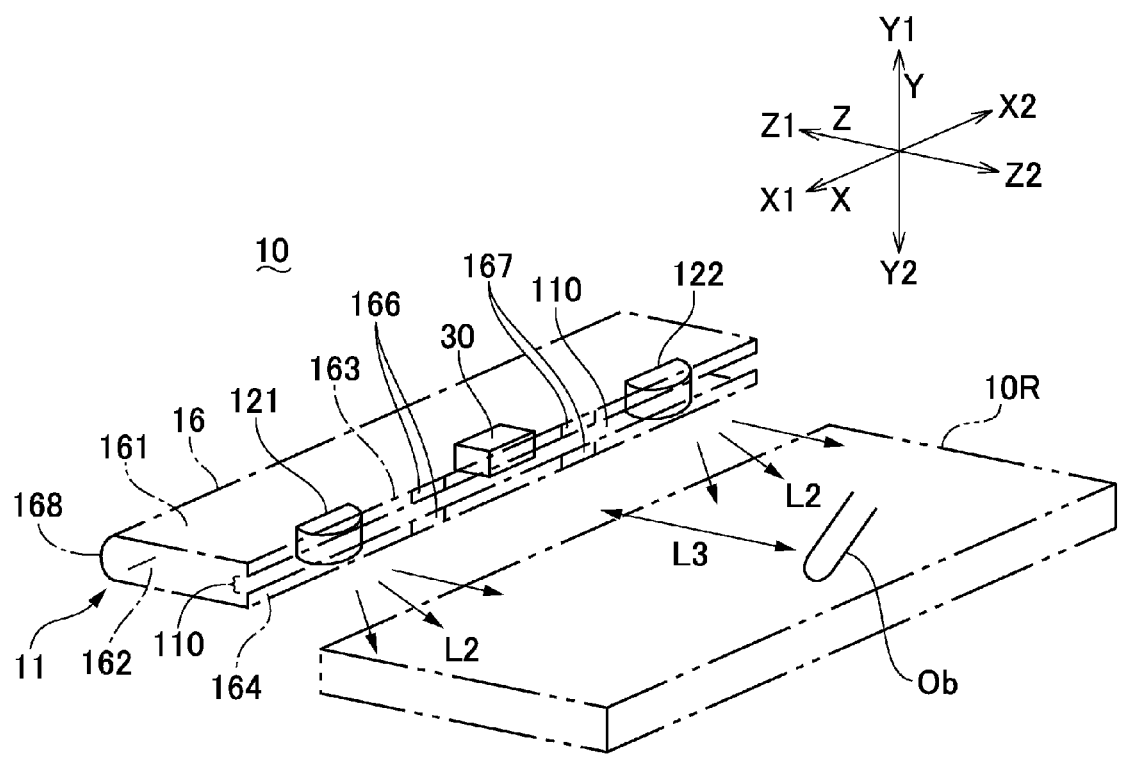
FIGS. 8A and 8B are explanatory views schematically illustrating a main portion of an optical position detection apparatus according to embodiment 3 of the invention.
Figure 8B:
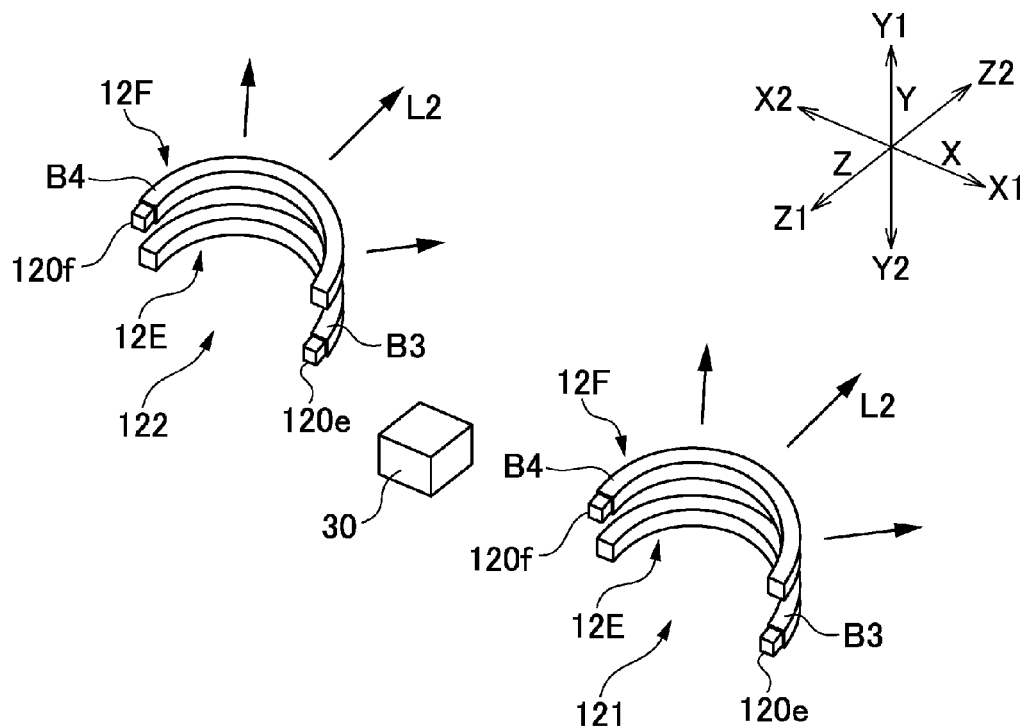
Figure 9A:
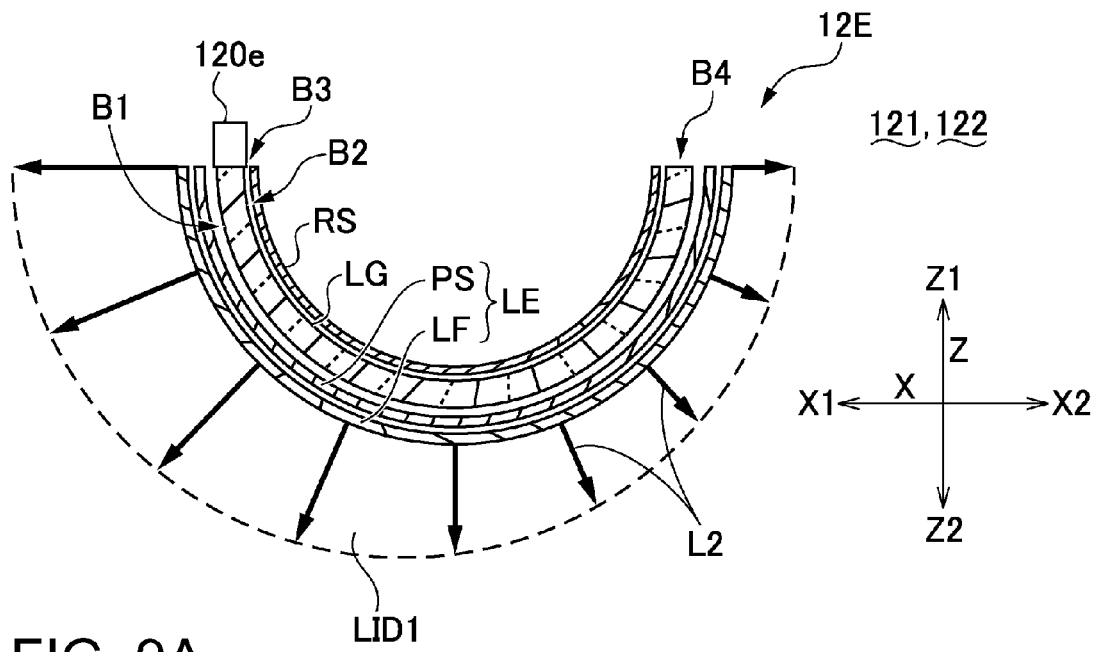
FIGS. 9A and 9B are explanatory views of a light source unit that is used in an optical position detection apparatus according to embodiment 3 of the invention.
Figure 9B:
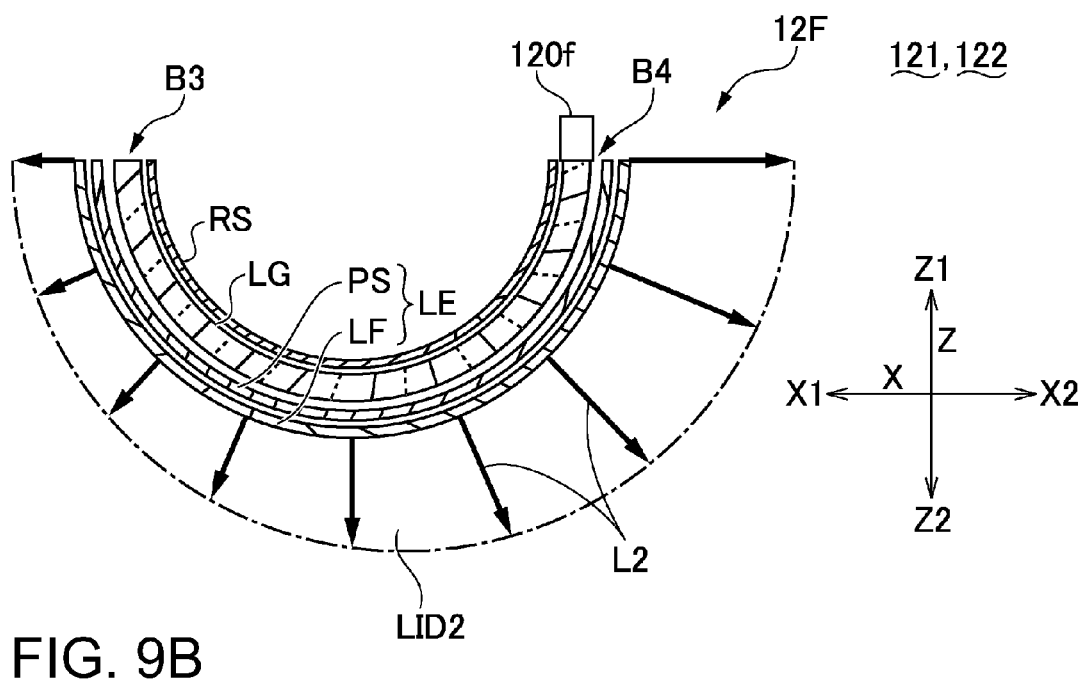
Figure 10A:
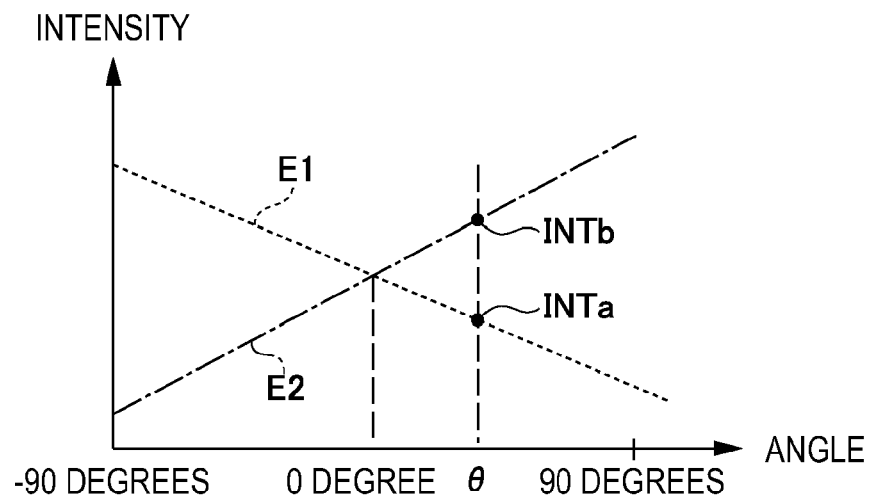
FIGS. 10A and 10B are explanatory diagrams illustrating the principle of detecting a position in an optical position detection apparatus according to embodiment 3 of the invention.
Figure 10B:
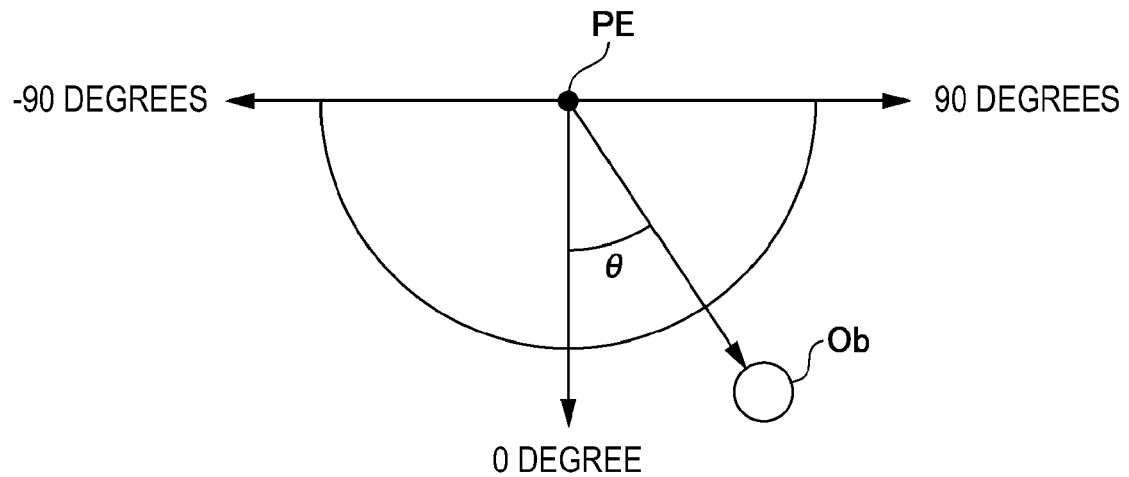
Figure 11:
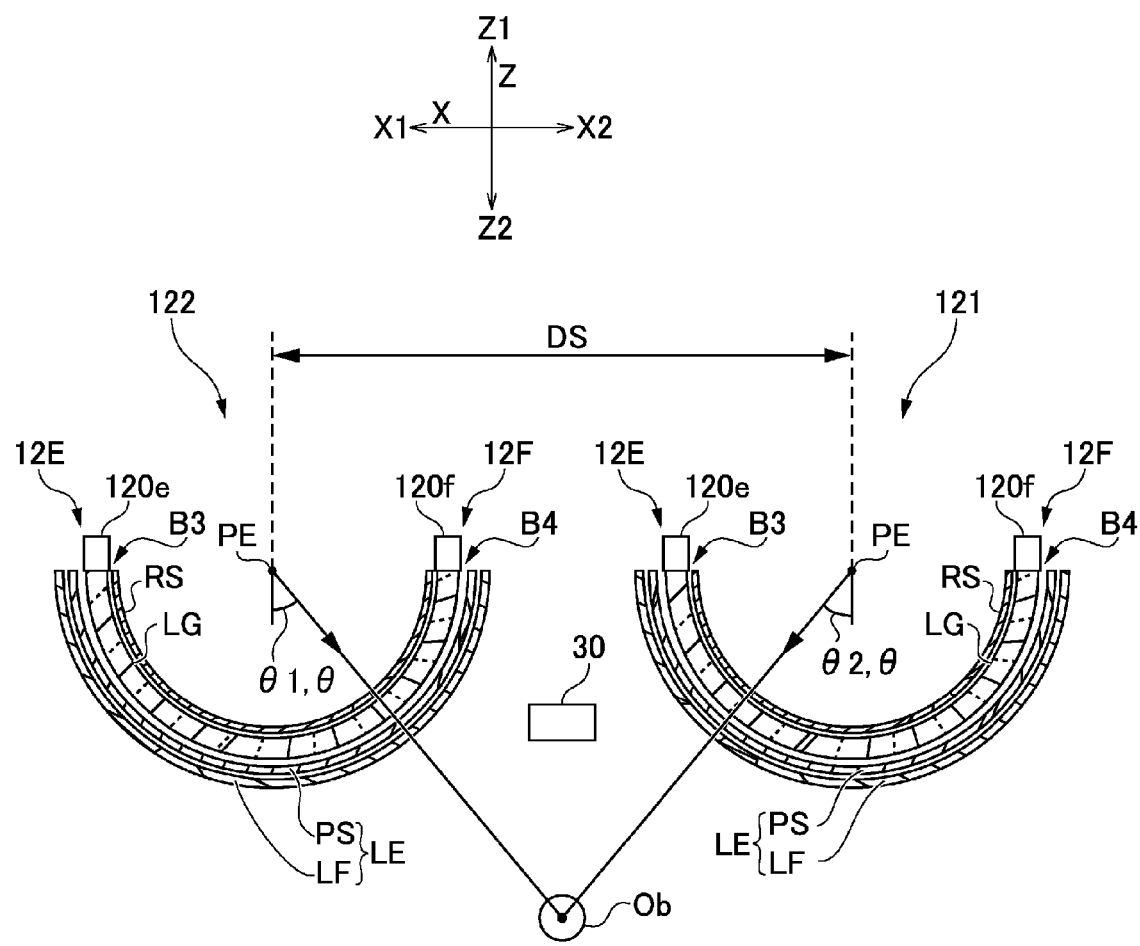
FIG. 11 is an explanatory diagram illustrating a method of specifying a position of a target object in an optical position detection apparatus according to embodiment 3 of the invention.

FIGS. 8A and 8B are explanatory views schematically illustrating a main portion of an optical position detection apparatus according to embodiment 3 of the invention, in which FIG. 8A is an explanatory view of an optical unit of an optical position detection apparatus and FIG. 8B is an explanatory view of a light source unit. FIGS. 9A and 9B are explanatory views of two light source units which constitute a light source unit that is used in an optical position detection apparatus according to embodiment 3 of the invention. FIGS. 10A and 10B are explanatory diagrams illustrating the principle of detecting a position in an optical position detection apparatus according to embodiment 3 of the invention, in which FIG. 10A is an explanatory view of light intensity distribution, and FIG. 10B is an explanatory view illustrating a method of acquiring position information (direction information) where a target object is present. FIG. 11 is an explanatory diagram illustrating a method of specifying a position of a target object in an optical position detection apparatus according to embodiment 3 of the invention. Since the basic configuration in this embodiment is the same as that in embodiment 1, the same reference numerals are used for the common portions, and the description thereof will be omitted.

As illustrated in FIGS. 8A to 9B, the optical position detection apparatus 10 according to this embodiment includes an optical unit 11 having a light emission surface 110 that emits a detection light L2. The optical unit 11 includes a plurality of light source modules 121 and 122 emitting detection lights L2 in a semicircle direction, a light receiving unit 30 detecting a part of the detection light L3 that is reflected by the target object Ob among the detection lights L2 emitted from the light source modules 121 and 122, and a housing 16 covering the light source modules 121 and 122 and the light receiving unit 30.

In the optical unit 11, the light source modules 121 and 122 are arranged in the same position in the Z-axis direction, and the light source modules 121 and 122 emit the detection lights L2. In this embodiment, the emission space of the detection lights L2 form a detection space 10R where the position of the target object Ob is detected.

Here, the light source module 121 radially emits the detection light L2 in a first period, and the light source module 122 sequentially and radially emits the detection light L2 in a second period. Accordingly, the position detection unit 50 detects the position of the target object Ob based on the result of receiving the detection light L2 through the light receiving unit 30 in the first period and the result of receiving the detection light L22 through the light receiving unit 30 in the second period.

In this embodiment, in adopting the above-described position detection method as illustrated in FIG. 8B, the light source module 121 is provided with a first light source unit 12E and a second light source unit 12F arranged to overlap each other in the Y-axis direction, and the light source module 122, in the same manner as the light source module 121, is provided with a first light source unit 12E and a second light source unit 12F arranged to overlap each other in the Y-axis direction.

Here, the first light source unit 12E, as illustrated in FIG. 9A, is provided with a light source 120e composed of a light emission element such as a light emitting diode or the like that emits infrared light and an arc-shaped light guide LG. The light source 120e is arranged at one end portion B3 of the light guide LG. Further, the first light source unit 12E is provided with an arc-shaped irradiation direction setting unit LE having an optical sheet PS and a louver film LF formed along an arc-shaped outer periphery of the light guide LG and an arc-shaped reflective sheet RS formed along an arc-shaped inner periphery of the light guide LG.

Further, as illustrated in FIG. 9B, in the same manner as the first light source unit 12E, the second light source unit 12F is provided with a light source 120f composed of a light emission element such as a light emitting diode or the like that emits infrared light and an arc-shaped light guide LG. The light source 120f is arranged at the other end portion B4 of the light guide LG. Further, in the same manner as the first light source unit 12E, the second light source unit 12F is provided with an arc-shaped irradiation direction setting unit LE having an optical sheet PS and a louver film LF formed along an arc-shaped outer periphery of the light guide LG and an arc-shaped reflective sheet RS formed along an arc-shaped inner periphery of the light guide LG.

In this case, on at least one side of the outer periphery and the inner periphery of the light guide LG, processing for adjusting the emission efficiency of the detection light from the light guide LG is performed, and as such a processing method, for example, a reflection dot printing method, a molding method for attaching prominence and depression by stamper or injection, or a groove processing method may be adopted.

In the optical position detection apparatus 10 as configured above, if the light source 120e of the first light source unit 12E in the light source module 121 is turned on, the detection light L2 is emitted to the detection space 10R, and a first light intensity distribution LID1 is formed in the detection space 10R. The first light intensity distribution LID1 is intensity distribution in which the intensity is monotonously lowered from the angle direction that corresponds to one end portion B3 to the angle direction that corresponds to the other end portion B4 as the intensity of the emitted light is indicated by the length of an arrow in FIG. 9A.

By contrast, if the light source 120f of the second light source unit 12F is turned on, the detection light is emitted to the detection space 10R, and a second light intensity distribution LID2 is formed in the detection space 10R. The second light intensity distribution LID2 is intensity distribution in which the intensity is monotonously lowered from the angle direction that corresponds to the other end portion B4 to the angle direction that corresponds to one end portion B3 as the intensity of the emitted light is indicated by the length of an arrow in FIG. 9B.

In a case where the light source 120e of the first light source unit 12E is turned on in the light source module 122, and in a case where the light source 120f of the second light source unit 12F is turned on in the light source module 122, the first light intensity distribution LID1 and the second light intensity distribution LID2 are formed in the same manner as the light source module 121. Accordingly, as described hereinafter, the position of the target object Ob can be detected using the first light intensity distribution LID1 and the second light intensity distribution LID2.

First, when the first light intensity distribution LID1 is formed in the first light source unit 12E of the light source module 121, the irradiation direction of the detection light L2 and the intensity of the detection light L2 have the relationship as indicated by E1 in FIG. 10A. Further, when the second light intensity distribution LID2 is formed in the second light source unit 12F of the light source module 121, the irradiation direction of the detection light L2 and the intensity of the detection light L2 have the relationship as indicated by E2 in FIG. 10A. Here, as illustrated in FIGS. 10B and 11, as seen from the center PE of the light source module 121 (the center of the first light source unit 12E), it is considered that the target object Ob is present in the direction of an angle Θ. In this case, when the first light intensity distribution LID1 is formed, the intensity of the detection light L2 in the position where the target object Ob is present becomes INTa. By contrast, when the second light intensity distribution LID2 is formed, the intensity of the detection light L2 in the position where the target object Ob is present becomes INTb. Accordingly, by obtaining the relationship between the intensities INTa and INTb through comparison of the detection intensity in the light receiving unit 30 when the first light intensity distribution LID1 is formed with the detection intensity in the light receiving unit 30 when the second light intensity distribution LID2 is formed, the angle Θ (angle Θ1) in the direction in which the target object Ob is positioned based on the center PE of the light source module 121 can be obtained.

If the angle θ (angle θ2) in the direction in which the target object Ob is positioned based on the center PE of the light source modules 121 and 122 is obtained through performing of the above-described operation with respect to the light source module 122, the position of the target object Ob can be specified based on the center PE of the light source modules 121 and 122.

In this case, it is also possible to obtain the angle Θ (angle Θ1) in the direction in which the target object Ob is positioned from the ratio of the drive current when the light sources 120e and 120f are driven to the adjusted drive current or the like so that the detection intensity in the light receiving unit 30 when the first light intensity distribution LID1 is formed by the first light source unit 12E of the light source module 121 becomes equal to the detection intensity in the light receiving unit 30 when the second light intensity distribution LID2 is formed by the second light source unit 12F of the light source module 121. Further, it is also possible to obtain the angle Θ (angle Θ2) in the direction in which the target object Ob is positioned from the ratio of the drive current when the light sources 120e and 120f are driven to the adjusted drive current or the like so that the detection intensity in the light receiving unit 30 when the first light intensity distribution LID1 is formed by the first light source unit 12E of the light source module 122 becomes equal to the detection intensity in the light receiving unit 30 when the second light intensity distribution LID2 is formed by the second light source unit 12F of the light source module 122.

Even in a case of adopting the method of detecting the position of the target object Ob as described above, it is necessary to appropriately perform the initial setting of the relationship between the drive current of the light sources 120e and 120f of the first light source unit 12E and the second light source unit 12F and the light intensity in the light receiving unit 30. Accordingly, even in the optical position detection apparatus 10 according to this embodiment as illustrated in FIGS. 8A and 8B, in the same manner as embodiment 1, the reflection units 166 and 167 for generating the default light are installed, which reflect parts of the detection lights L2 emitted from the first light source unit 12E and the second light source unit 12F by parts of the front-side housing portions 163 and 164 and make the reflected lights be incident to the light receiving unit 30 in the detection space 10R (emission space) as the default lights. Accordingly, when the first light source unit 12E and the second light source unit 12F are sequentially turned on, the default lights having the intensities that are in conjunction with the detection lights L2 emitted from the first light source unit 12E and the second light source unit 12F are incident to the light receiving unit 30 even in a state where the target object Ob is not present. Due to this, based on the light intensity in the light receiving unit 30 with respect to the default lights, the first light source unit 12A and the second light source unit 12B can correct the initial value or the like of the drive current so as to emit the detection lights L2 having a predetermined intensity.

Embodiment 4

In embodiment 3 as described above, the optical position detection apparatus 10 is configured so that the default lights DLa and DLb are incident to the light receiving unit 30 by the reflection units 166 and 167 for generating the default light even in a state where the target object Ob is not present. However, in the optical position detection apparatus 10 adopting the detection principle as described above in embodiment 3, in the same manner as embodiment 2, the default lights may be incident to the light receiving unit 30 using light sources for generating a default light that are electrically connected to the light sources L21 and 120f in parallel or in series.

Configuration Example 1 of an Appliance Having a Position Detection Function

Figure 12A:
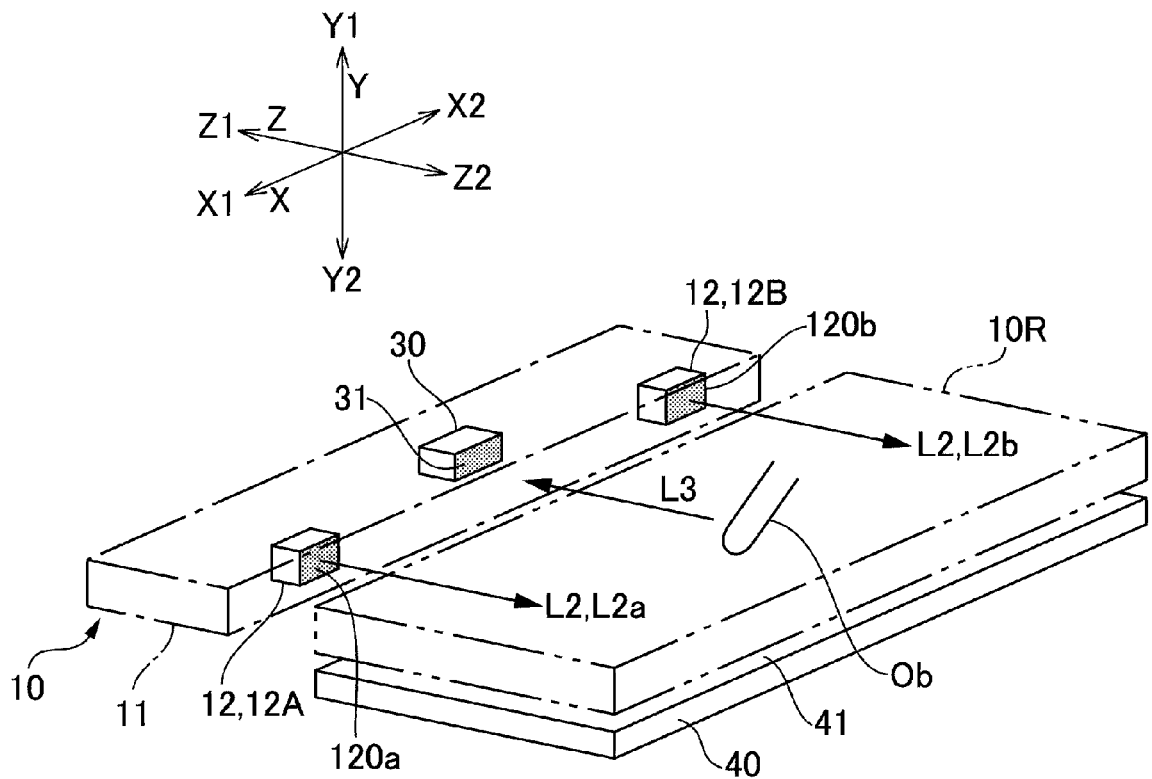
FIGS. 12A and 12B are explanatory views of an appliance having a position detection function that uses an optical position detection apparatus to which the invention is applied.
Figure 12B:
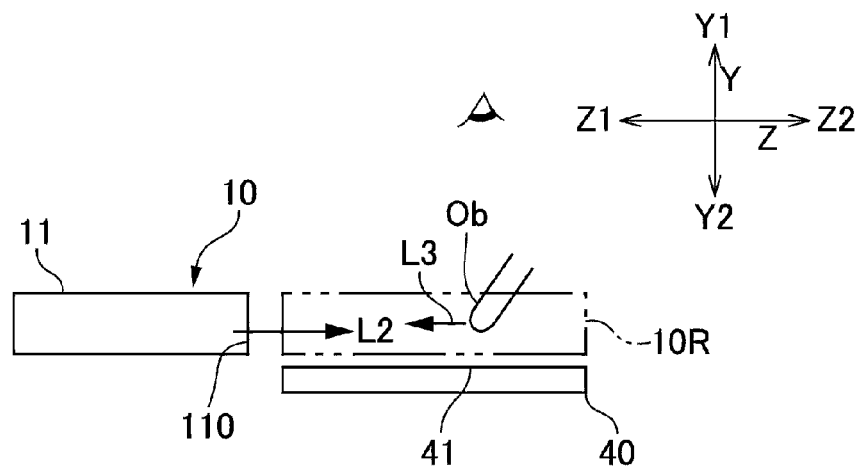

FIGS. 12A and 12B are explanatory views of an appliance having a position detection function that uses an optical position detection apparatus 10 to which the invention is applied, in which FIG. 12A is an explanatory view illustrating the position relationship between the optical unit 11 and the visible surface configuration member of the optical position detection apparatus, and FIG. 12B is an explanatory view illustrating the optical unit 11 as seen from the X-axis direction.

As illustrated in FIGS. 12A and 12B, the optical position detection apparatus 10 as described above with reference to FIGS. 1 to 11 may be used to configure an appliance 1 having a position detection function provided with a visible surface configuration member 40. The visible surface configuration member 40 is formed of a sheet-shaped or plate-shaped light transmissive member that is positioned on the other side Z2 in the Z-axis direction with respect to the optical unit 11 provided with the light source unit 12 and the light receiving unit 30.

Here, the visible surface configuration member 40 is arranged so that a visible surface 41 is spread along the XZ plane, and from the optical unit 11 of the optical position detection apparatus 10, the detection light L2 is emitted along the visible surface 41. Accordingly, if a user moves the target object Ob, which may be a finger end or the like, to a specified position while seeing information that is displayed on the visible surface 41 of the visible surface configuration member 40, the operation of the optical position detection apparatus 10 can be changed in consideration of the position of the target object Ob as input information.

As will be described with reference to FIGS. 13 to 17B, the appliance 1 having the position detection function as described above may be configured as a direct-view display device having a position detection function, a screen device having a position detection function, a projection display device having a position detection function, a show window having a position detection function, or an amusement appliance having a position detection function.

Configuration Example of a Direct-View Display Device Having a Position Detection Function Referring to FIG. 13, an example of a direct-view display device having a position detection function, which uses a direct-view image generation device as the visible surface configuration member 40 of the appliance 1 having the position detection function, will be described.

Figure 13:
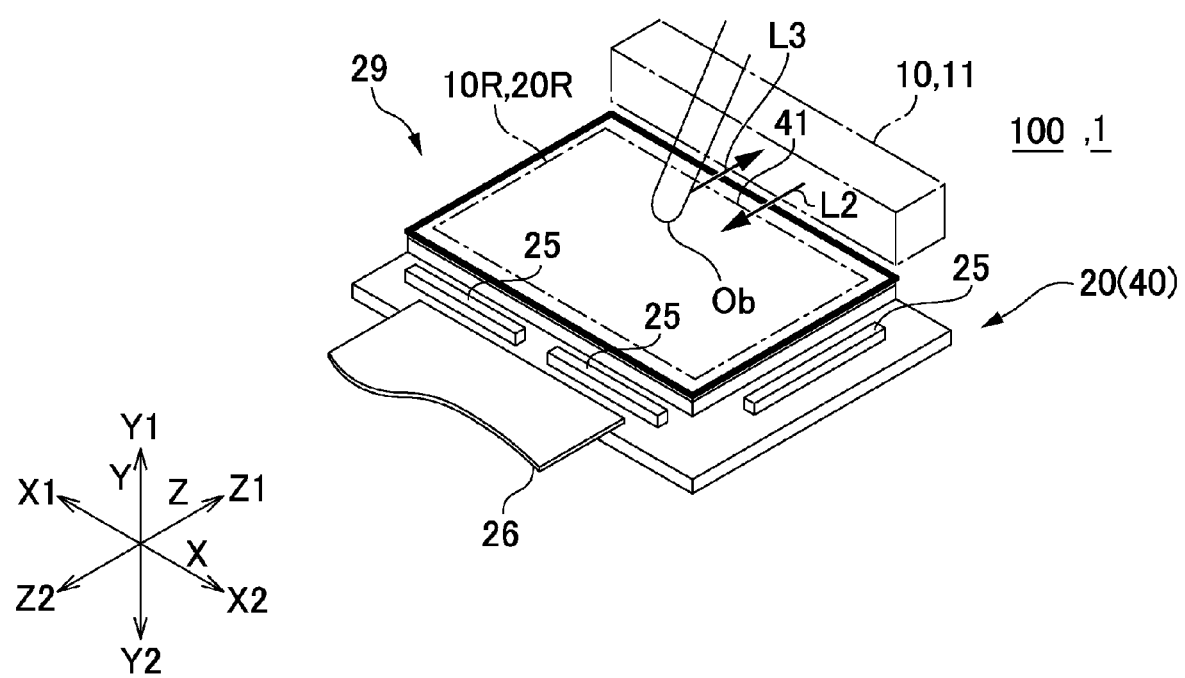
FIG. 13 is an exploded perspective view of a direct-view display device having a position detection function (an appliance having a position detection function) to which the invention is applied.

FIG. 13 is an exploded perspective view of a direct-view display device having a position detection function (an appliance 1 having a position detection function) to which the invention is applied. In the direct-view display device having the position detection function in this embodiment, since the configuration of the optical position detection apparatus 10 is the same as that as described above with reference to FIGS. 1 to 11, the same reference numerals are used for the common portions, and the description thereof will be omitted.

The direct-view display device 100 having the position detection function as illustrated in FIG. 13 includes the optical position detection apparatus 10 as described above with reference to FIGS. 1 to 11, and various kinds of direct-view image generation devices 20 (direct-view display device/visible surface configuration member 40). The direct-view display device 100 is provided with a visible surface 41 on which information is visible by one surface of the image generation device 20. The image generation device 20 is provided with an image display region 20R on the visible surface 41, and this image display region 20R overlaps the detection space 10R as seen in the Y-axis direction.

The image generation device 20 is provided with an image generation panel 29. On the image generation panel 29, for example, electronic components 25 that configure driving circuits and the like are mounted and a wire member 26 of a flexible printed circuit board (FPC) or the like is connected.

In the direct-view display device 100 having the position detection function as configured above, the optical position detection apparatus 10 is provided with the optical unit 11 on the side of the image display region 20R of the image generation device 20. Accordingly, the direct-view display device 100 having the position detection function can detect the position of the target object Ob, and by indicating the image displayed on the image generation device 20 with the target object Ob such as a finger end or the like, specified information input can be performed.

Configuration Example of a Screen Device Having a Position Detection Function

Figure 14A:
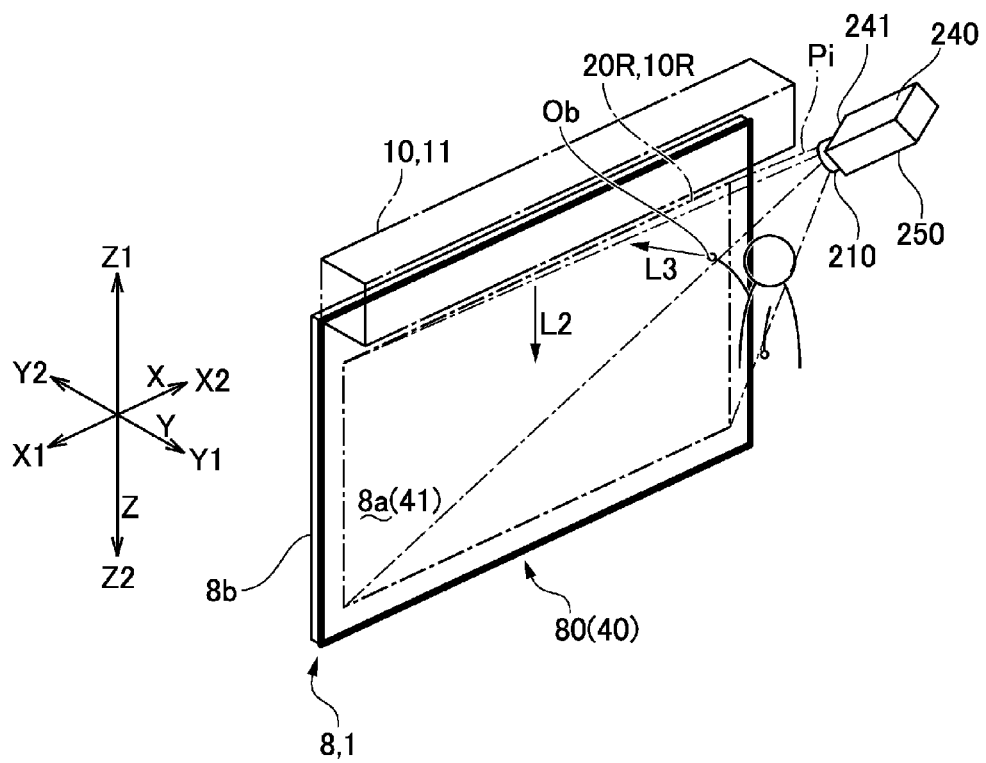
FIGS. 14A and 14B are explanatory views of a screen device having a position detection function (an appliance having a position detection function) to which the invention is applied.
Figure 14B:
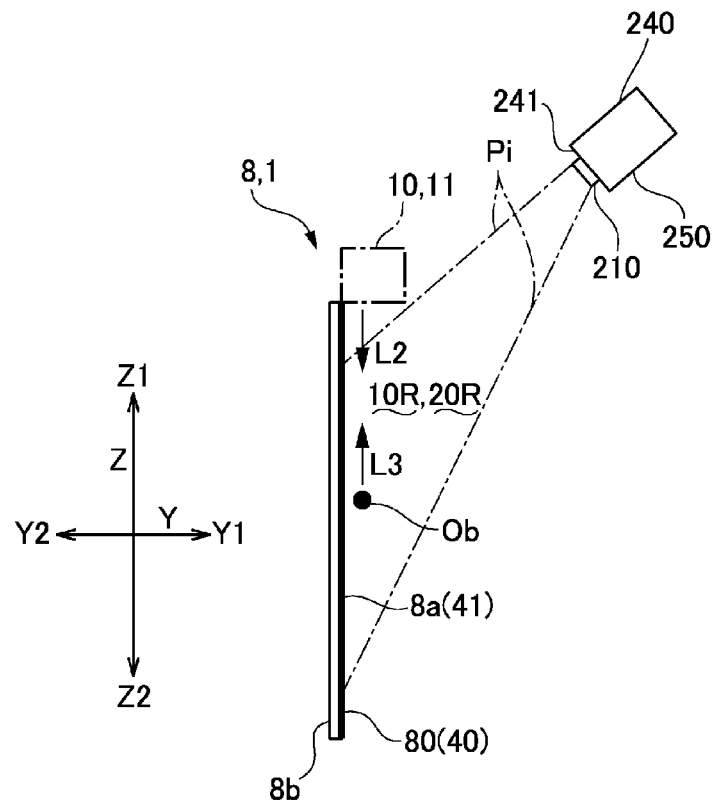

Referring to FIGS. 14A and 14B, an example of a screen device having a position detection function, which uses a screen as the visible surface configuration member 40 of the appliance 1 having the position detection function and has the position detection function of the appliance 1, will be described.

FIGS. 14A and 14B are explanatory views of a screen device having a position detection function (an appliance 1 having a position detection function) to which the invention is applied, in which FIG. 14A is an explanatory view schematically illustrating a screen device having the position detection function as seen obliquely from an upper portion, and FIG. 14B is an explanatory view schematically illustrating a screen device as seen from the horizontal direction. In the screen device having the position detection function in this embodiment, since the configuration of the optical position detection apparatus 10 is the same as that as described above with reference to FIG. 7, the same reference numerals are used for the common portions, and the description thereof will be omitted.

The screen device 8 having the position detection function as illustrated in FIGS. 14A and 14B includes a screen (visible surface configuration member 40) onto which an image from an image projection device 250 (image generation device) that is called a liquid crystal projector or a digital micro-mirror device is projected, and the optical position detection apparatus 10 as described above with reference to FIGS. 1 to 11. The image projection device 250 expands and projects an image display light Pi from a projection lens system 210 installed on a front surface unit 241 of the housing 240 to the screen device 8. Accordingly, in the screen device 8 having the position detection function, the visible surface 41 on which information is visible is configured by a screen surface 8a of the screen 80 onto which the image is projected.

In the screen device 8 having the position detection function as described above, the optical position detection apparatus 10 is provided with the optical unit 11 on the side of the screen surface 8a (the visible surface 41) of the screen 80 (the visible surface configuration member 40). Accordingly, in the screen device 8 having the position detection function in this embodiment, for example, by approaching the target object Ob such as a finger end or the like to apart of an image projected onto the screen 80, the position of the target object Ob can be used as input information such as instruction for changing the image.

In this embodiment, as the screen device 8 having the position detection function, the screen device for the projection display device onto which the image from the image projection device 250 is projected has been described. However, a screen device having the position detection function for an electronic blackboard may be configured by installing the optical position detection apparatus 10 on the screen of the electronic blackboard.

Configuration Example of a Projection Display Device Having a Position Detection Function Referring to FIGS. 15A and 15B, an example of a projection display device having a position detection function, which uses a screen as the visible surface configuration member 40 of the appliance 1 having the position detection function, will be described.

Figure 15A:
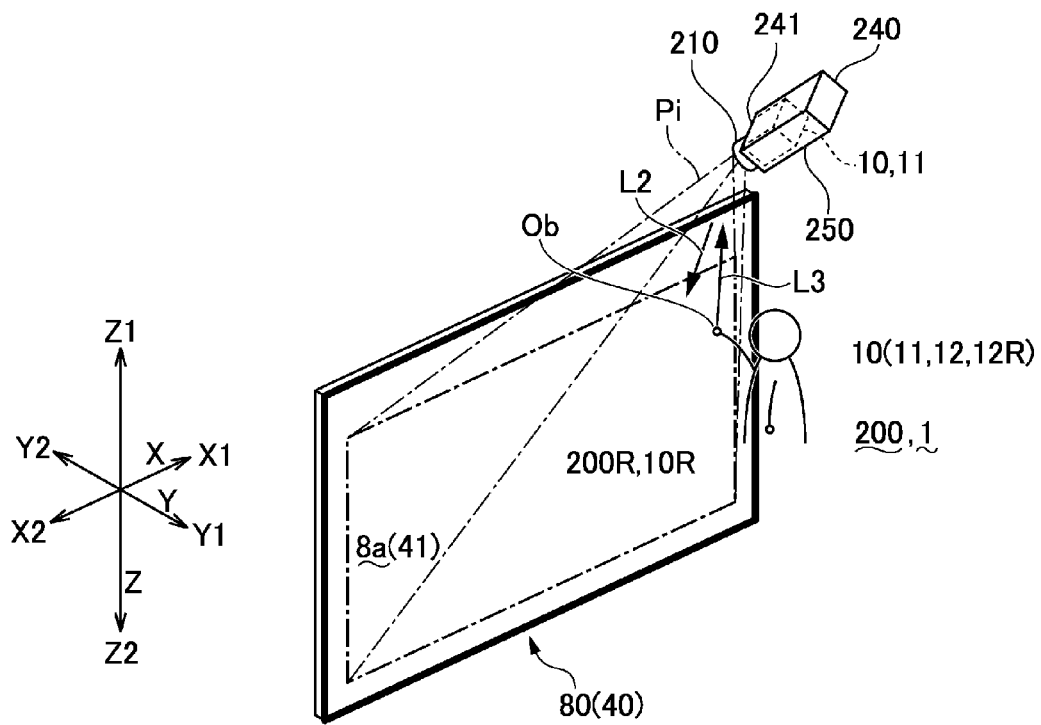
FIGS. 15A and 15B are explanatory views of a projection display device having a position detection function (an appliance having a position detection function) to which the invention is applied.
Figure 15B:
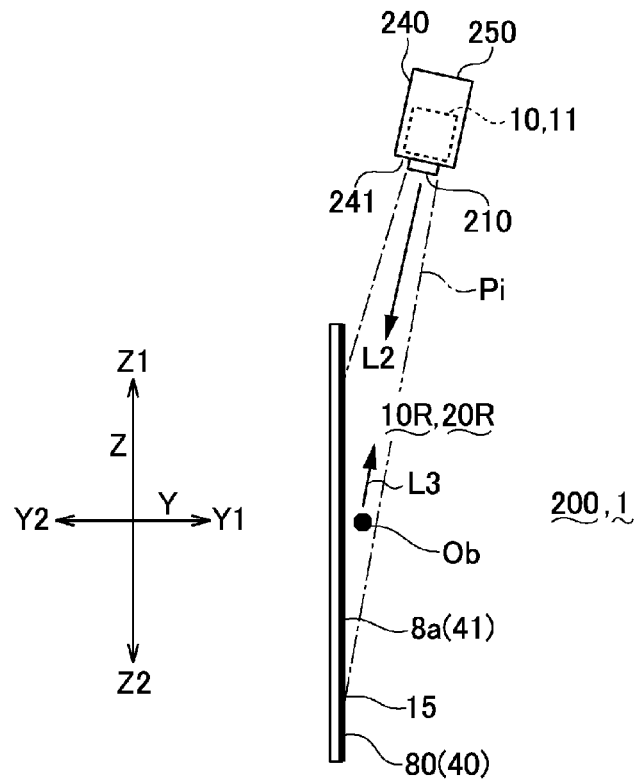

FIGS. 15A and 15B are explanatory views of a projection display device having a position detection function (an appliance 1 having a position detection function) to which the invention is applied, in which FIG. 15A is an explanatory view schematically illustrating a projection display device having the position detection function as seen obliquely from an upper portion, and FIG. 15B is an explanatory view schematically illustrating a projection display device as seen from the horizontal direction. In the projection display device having the position detection function in this embodiment, since the configuration of the optical position detection apparatus 10 is the same as that as described above with reference to FIGS. 1 to 11, the same reference numerals are used for the common portions, and the description thereof will be omitted.

The projection display device 200 having the position detection function as illustrated in FIGS. 15A and 15B includes an image projection device 250 (image generation device) that is called a liquid crystal projector or a digital micro-mirror device, and the optical position detection apparatus 10 as described above with reference to FIGS. 1 to 11. The image projection device 250 expands and projects an image display light Pi from a projection lens system 210 installed on a front surface unit 201 of the housing 240 to the screen device 8. In the projection display device 200 as described above, the visible surface 41 on which information is visible is configured by a screen surface 8a of the screen 80 onto which the image is projected.

In the projection display device 200 having the position detection function as described above, the optical position detection apparatus 10 is mounted on the image projection device 250 that is arranged on the side of the screen surface 8a (visible surface 41) of the screen 80. Accordingly, the optical position detection apparatus 10 emits the detection light L2 from the image projection device 250 along the visible surface 41 of the screen 80 (visible surface configuration member 40). Further, the optical position detection apparatus 10 detects the detection light L3 that is reflected by the target object Ob from the image projection device 250.

In the projection display device 200 having the position detection function as described above, the detection space 10R is a rectangular region as seen from the direction of the normal line with respect to the screen 80, and overlaps the region (image display region 20R) onto which the image is projected by the image projection device 250 in the screen 80. Accordingly, in the projection display device 200 having the position detection function in this embodiment, for example, by approaching the target object Ob such as a finger end or the like to a part of an image projected onto the screen 80, the position of the target object Ob can be used as input information such as instruction for changing the image.

Configuration example of a show window having a position Detection Function

Figure 16A:
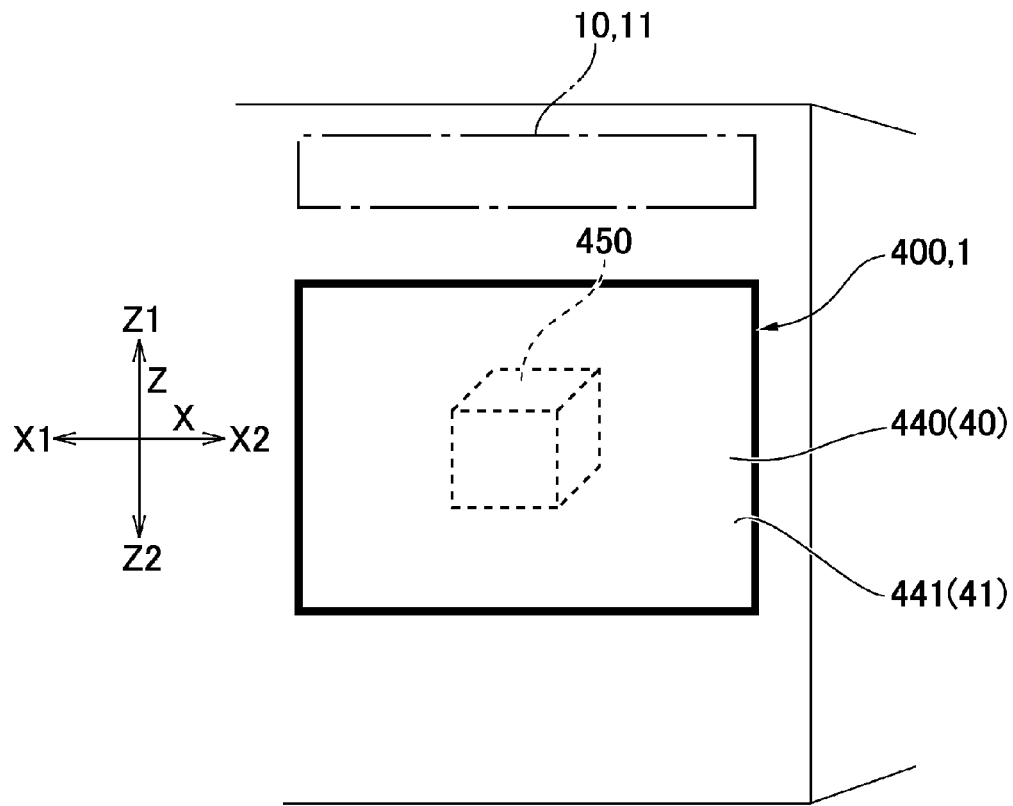
FIGS. 16A and 16B are explanatory views of a window having a position detection function (an appliance having a position detection function) to which the invention is applied.
Figure 16B:
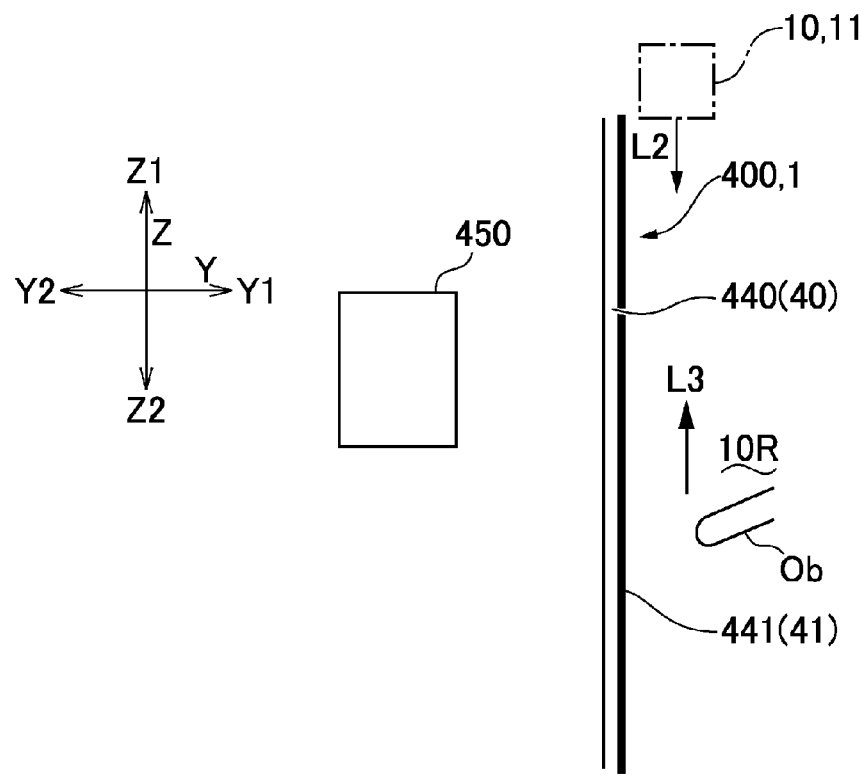

Referring to FIGS. 16A and 16B, an example of a window (show window having a position detection function) having a position detection function, which uses a light transmissive member that covers an exhibit as information, as the visible surface configuration member 40 of the appliance 1 having the position detection function, will be described.

FIGS. 16A and 16B are explanatory views of a window (an appliance 1 having a position detection function) having a position detection function to which the invention is applied, in which FIG. 16A is an explanatory view schematically illustrating a window having the position detection function as seen from the outside (visible surface side), and FIG. 16B is an explanatory view schematically illustrating the cross section of the window. In the window having the position detection function in this embodiment, since the configuration of the optical position detection apparatus 10 is the same as that as described above with reference to FIGS. 1 to 11, the same reference numerals are used for the common portions, and the description thereof will be omitted.

The window 400 having the position detection function as illustrated in FIGS. 16A and 16B includes a light transmissive member 440 (visible surface configuration member 40) that covers the exhibit 450 as information, and visible surface (visible surface 41) of the exhibit 450 is configured by the outer surface 441 of the light transmissive unit 440. Further, in the window 400 having the position detection function, the exhibit 450 is maintained on an actuator (not illustrated) that makes the exhibit 450 perform an operation such as forward movement and swing.

The window 400 having the position detection function as described above is provided with the optical unit 11 of the optical position detection apparatus 10 as described above with reference to FIGS. 1 to 11 on the side of the outer surface 441 of the light transmissive member 440, and the optical unit 11 emits the detection light L2 along the outer surface 441 (visible surface 41) of the light transmissive member 440. Further, the optical unit 11 detects the detection light L3 that is reflected by the target object Ob.

In the window 400 having the position detection function as described above, the detection space 10R of the optical position detection apparatus 10 is installed on the side of the outer surface 441 of the light transmissive member 440. Accordingly, by approaching the target object Ob such as a finger end or the like to the detection space 10R, the position of the target object Ob can be used as input information such as instruction for changing the direction of the exhibit 450. For example, if the target object Ob such as the finger end or the like moves downward, the exhibit 450 approaches the light transmissive member 440, while if the target object Ob such as the finger end or the like moves to the right, the direction of the exhibit 450, such as swing the exhibit 450 to the right, can be changed.

Configuration Example of an Amusement Appliance Having a Position Detection Function Referring to FIGS. 17A and 17B, an example of an amusement appliance having a position detection function, which uses a base that supports a moving medium for a game in an amusement appliance such as a pachinko (Japanese pinball) machine as the visible surface configuration member 40 of the appliance 1 having the position detection function, will be described.

Figure 17A:
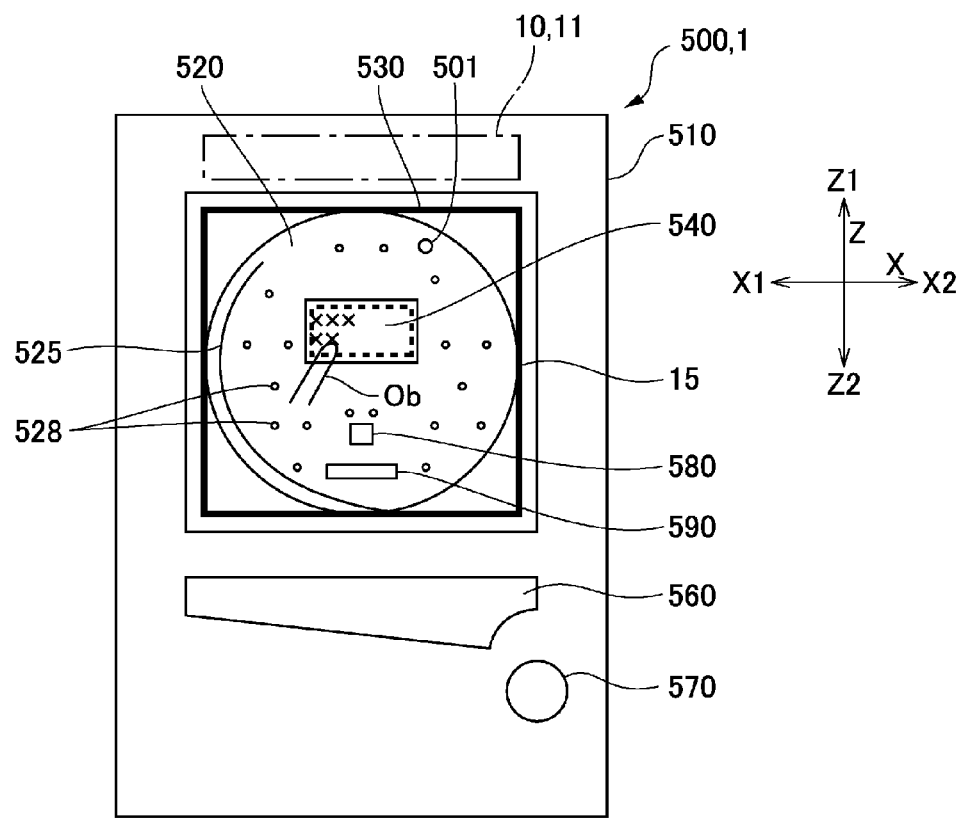
FIGS. 17A and 17B are explanatory views of an amusement device having a position detection function (an appliance having a position detection function) to which the invention is applied.
Figure 17B:
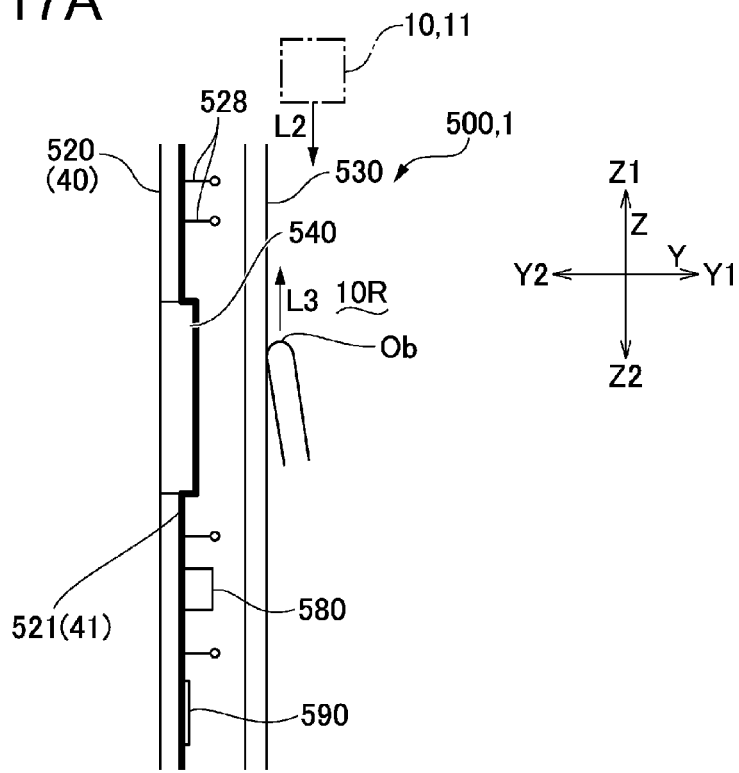

FIGS. 17A and 17B are explanatory views of an amusement appliance having a position detection function (an appliance 1 having a position detection function) to which the invention is applied, in which FIG. 17A is an explanatory view schematically illustrating an amusement appliance having the position detection function as seen from the front portion (visible surface side), and FIG. 17B is an explanatory view schematically illustrating the cross section thereof. In the amusement appliance having the position detection function in this embodiment, since the configuration of the optical position detection apparatus 10 is the same as that as described above with reference to FIGS. 1 to 11, the same reference numerals are used for the common portions, and the description thereof will be omitted.

The amusement appliance 500 having the position detection function as illustrated in FIGS. 17A and 17B includes a plate-shaped base 520 (visible surface configuration member 40) that supports a medium for a game 501 such as pachinko glass beads, an outer frame 510 for maintaining the base 520, a handle 570 for setting a position or the like in which the game medium 501 is output onto the base 520, and a saucer 560 for receiving the game medium 501. The surface 521 (visible surface 41) of the base 520 is covered by a glass plate 530, and inside the glass plate 530 on the surface 521 of the base 520, a guide rail 525 for the game medium 501, a nail 528 for changing the movement of the game medium 501, and winning openings 580 and 590 are provided. Further, inside the glass plate 530 on the surface 521 of the base 520, an image generation device 540 for displaying the result of the lottery that is performed whenever the game medium 501 enters into the winning opening 580.

In the amusement appliance 500 having the position detection function, the optical unit 11 of the optical position detection apparatus 10 described with reference to FIGS. 1 to 11 is installed on the outer side of the glass plate 530, and emits the detection light L2 according to the outer surface of the glass plate 530. Further, the optical unit 11 detects the detection light L3 that is reflected from the target object Ob.

Accordingly, if a gamer approaches the target object Ob such as a finger end or the like to the detection space 10R to match the contents displayed on the image generation device 540 or the progress of the game, the position of the target object Ob can be used as input information such as instruction for changing the contents displayed on the image generation device 540.

Configuration Example 2 of an Appliance Having a Position Detection Function

Figure 18A:
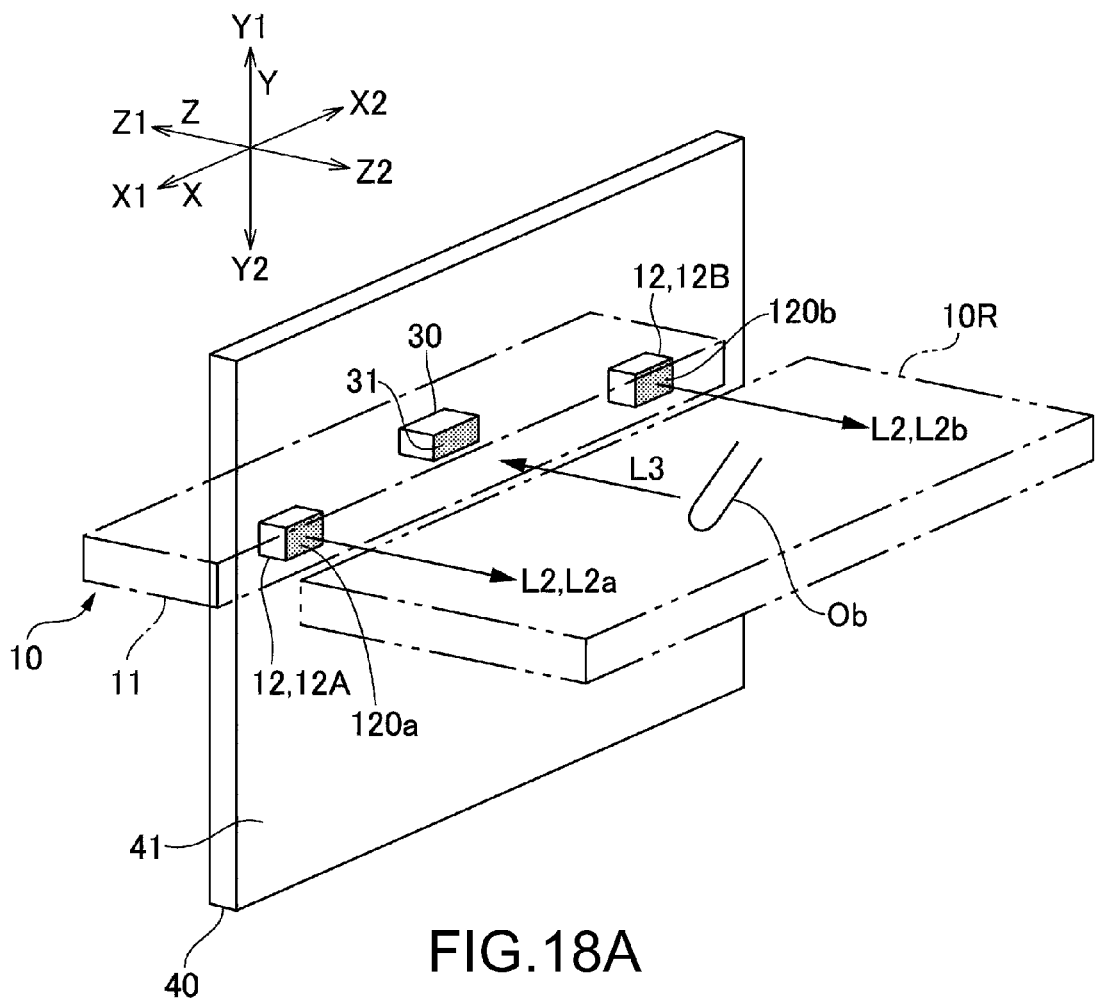
FIGS. 18A and 18B are explanatory views of an appliance having another position detection function using an optical position detection apparatus to which the invention is applied.
Figure 18B:
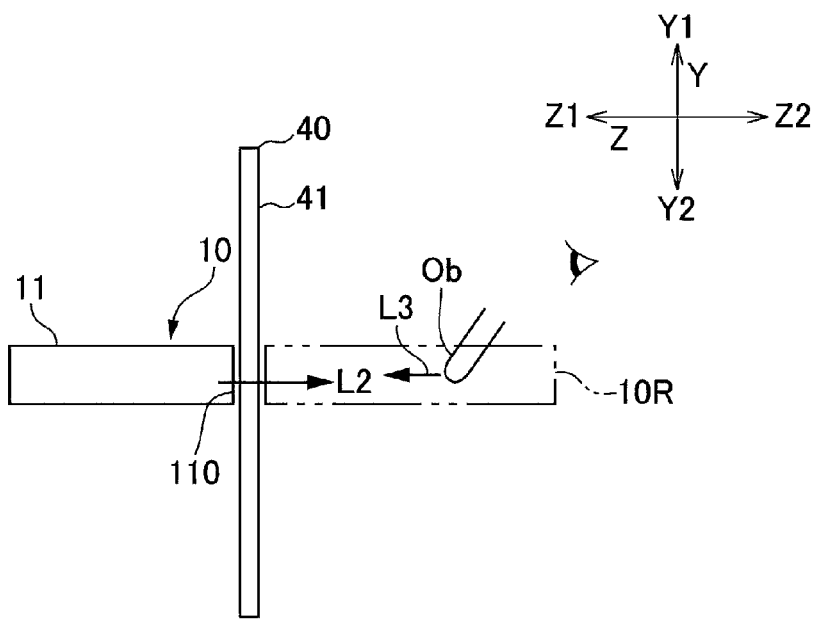

FIGS. 18A and 18B are explanatory views of an appliance having another position detection function that uses an optical position detection apparatus 10 to which the invention is applied, in which FIG. 18A is an explanatory view illustrating the position relationship between the optical unit 11 and the visible surface configuration member of the optical position detection apparatus, and FIG. 18B is an explanatory view illustrating the optical unit 11 as seen from the X-axis direction.

As illustrated in FIGS. 18A and 18B, the optical position detection apparatus 10 as described above with reference to FIGS. 1 to 11 may be used to configure an appliance 1 having a position detection function provided with a visible surface configuration member 40. The visible surface configuration member 40 is formed of a sheet-shaped or plate-shaped light transmissive member that is positioned on the other side Z2 in the Z-axis direction with respect to the optical unit 11 provided with the light source unit 12 and the light receiving unit 30.

Here, the visible surface configuration member 40 is arranged so that a visible surface 41 is spread along the XY plane, and from the optical unit 11 of the optical position detection apparatus 10, the detection light L2 is emitted along the visible surface 41. Accordingly, if a user moves the target object Ob, which may be a finger end or the like, to a specified position while seeing information that is displayed on the visible surface 41 of the visible surface configuration member 40, the operation of the optical position detection apparatus 10 can be changed in consideration of the position of the target object Ob as input information.

As will be described with reference to FIGS. 19 to 22B, the appliance 1 having the position detection function as described above may be configured as a direct-view display device having a position detection function, a screen device having a position detection function, a show window having a position detection function, or an amusement appliance having a position detection function.

Figure 19:
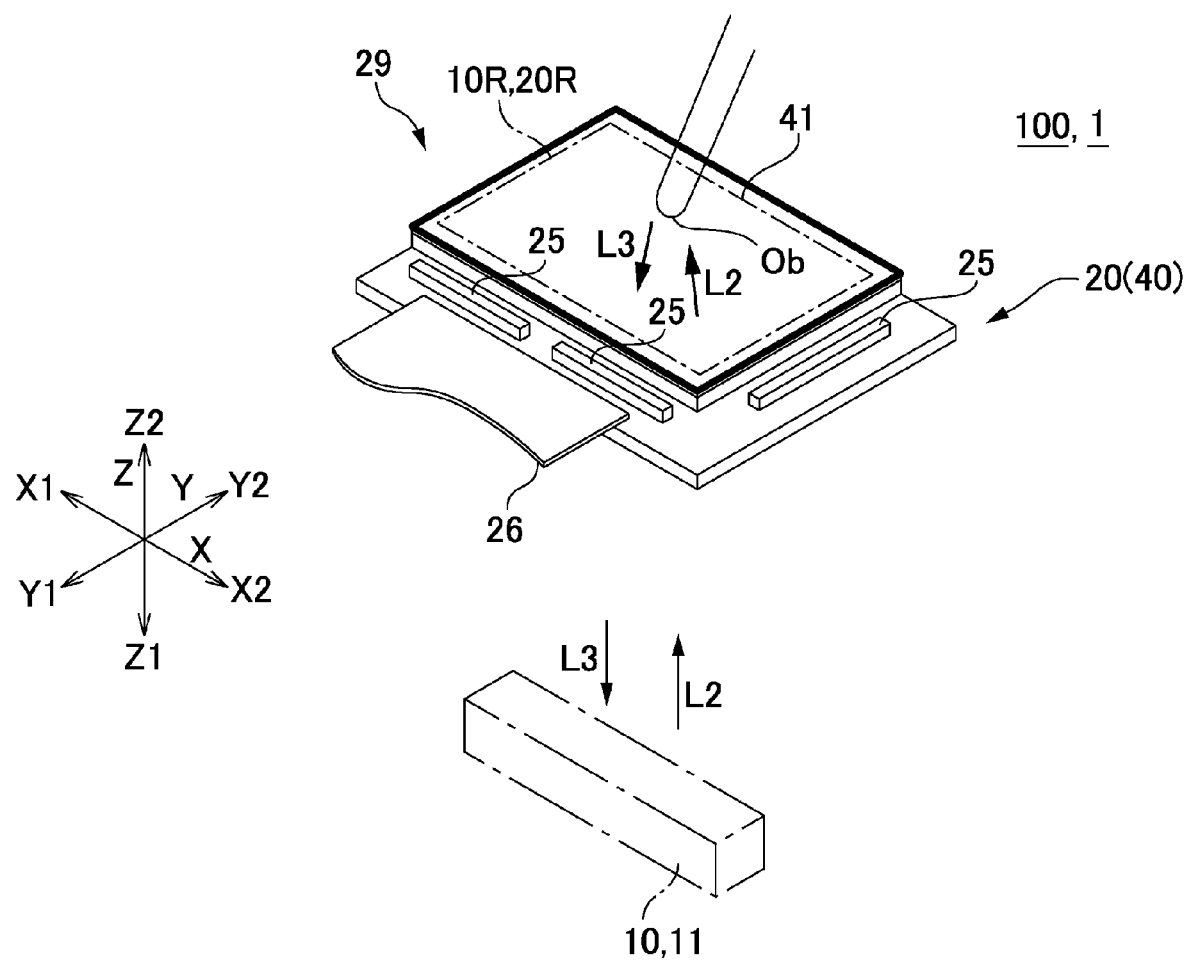
FIG. 19 is an exploded perspective view of a direct-view display device having another position detection function (an appliance having a position detection function) to which the invention is applied.

Configuration Example of a Direct-View Display Device Having a Position Detection Function FIG. 19 is an exploded perspective view of a direct-view display device having another position detection function (an appliance 1 having a position detection function) to which the invention is applied. In the direct-view display device having the position detection function in this embodiment, since the configuration of the optical position detection apparatus 10 is the same as that as described above with reference to FIGS. 1 to 11, the same reference numerals are used for the common portions, and the description thereof will be omitted.

The direct-view display device 100 having the position detection function as illustrated in FIG. 19 includes the optical position detection apparatus 10 as described above with reference to FIGS. 1 to 11, and various kinds of direct-view image generation devices 20 (direct-view display device/visible surface configuration member 40). The direct-view display device 100 is provided with a visible surface 41 on which information is visible by one surface of the image generation device 20. The image generation device 20 is provided with an image display region 20R on the visible surface 41, and this image display region 20R overlaps the detection space 10R as seen in the Y-axis direction. Since the image generation device 20 has the same configuration as the image generation device 20 as described above with reference to FIG. 13, the description thereof will be omitted. However, the image generation device 20 is provided with an image generation panel 29 and the like.

Here, the optical unit 11 of the optical position detection apparatus 10 is arranged on the opposite side to the emission side of the display light with respect to the image generation panel 29. Accordingly, in order to detect the position of the target object Ob, it is necessary to emit the detection light L2 to the detection space 10R in which the target object Ob is positioned. Accordingly, the image display region 20R of the image generation panel 29 is configured so as to transmit the detection light L2.

In the direct-view display device 100 having the position detection function as configured above, the optical unit 11 emits the detection light L2 to the detection space 10R which is positioned on the side of the visible surface 41 that is opposite to the side of the visible surface 41 in the optical position detection apparatus 20 (visible surface configuration member 40), and detects the detection light L3 that is reflected from the target object Ob and passes through the image generation device 20. Accordingly, the direct-view display device 100 having the position detection function can detect the position of the target object Ob, and by indicating the image displayed on the image generation device 20 with the target object Ob such as a finger end or the like, specified information input can be performed.

Configuration Example of a Screen Device Having a Position Detection Function

Figure 20A:
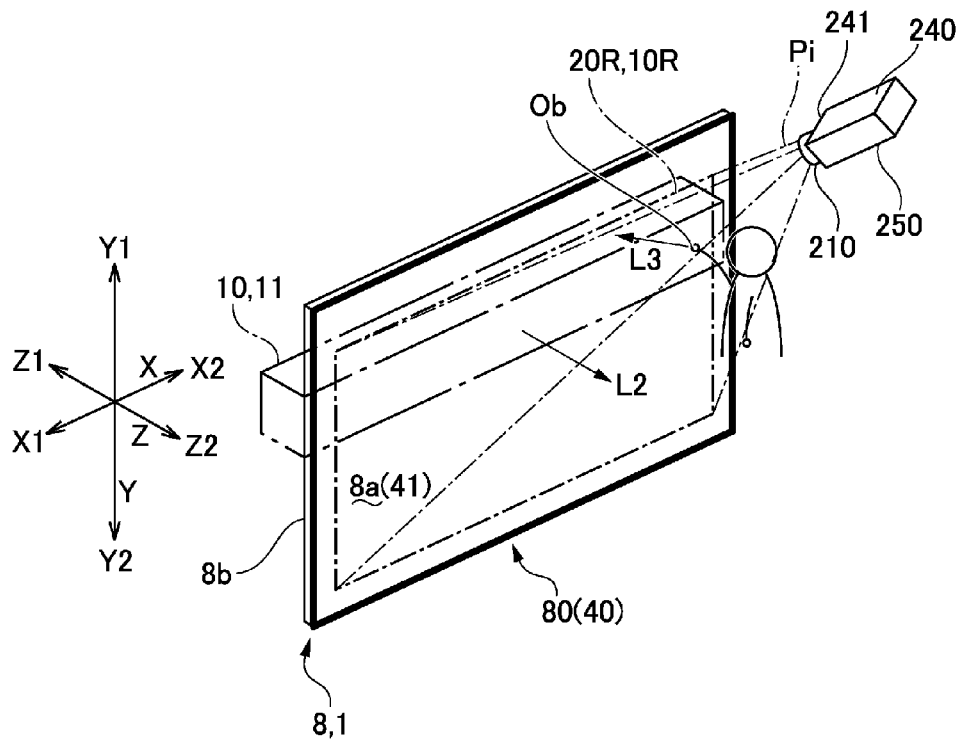
FIGS. 20A and 20B are explanatory views of a screen device having another position detection function (an appliance having a position detection function) to which the invention is applied.
Figure 20B:
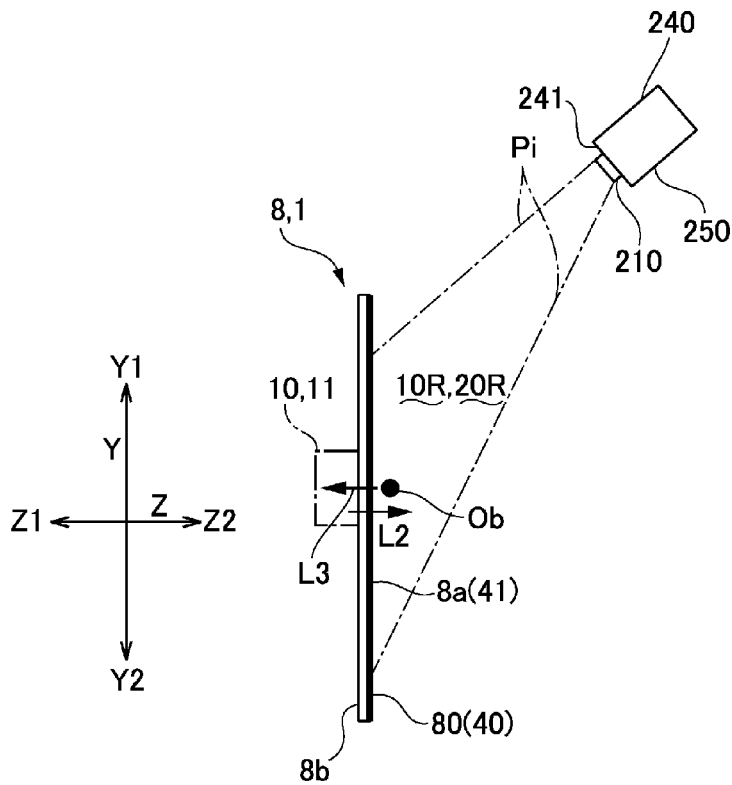

FIGS. 20A and 20B are explanatory views of a screen device having a position detection function (an appliance 1 having a position detection function) to which the invention is applied, in which FIG. 20A is an explanatory view schematically illustrating a screen device having the position detection function as seen obliquely from an upper portion, and FIG. 20B is an explanatory view schematically illustrating a screen device as seen from the horizontal direction. In the screen device having the position detection function in this embodiment, since the configuration of the optical position detection apparatus 10 is the same as that as described above with reference to FIG. 7, the same reference numerals are used for the common portions, and the description thereof will be omitted.

The screen device 8 having the position detection function as illustrated in FIGS. 20A and 20B includes a screen (visible surface configuration member 40) onto which an image from an image projection device 250 (image generation device) that is called a liquid crystal projector or a digital micromirror device is projected, and the optical position detection apparatus 10 as described above with reference to FIGS. 1 to 11. The image projection device 250 expands and projects an image display light Pi from a projection lens system 210 installed on a front surface unit 241 of the housing 240 to the screen device 8. Accordingly, in the screen device 8 having the position detection function, the visible surface 41 on which information is visible is configured by a screen surface 8a of the screen 80 onto which the image is projected.

In the screen device 8 having the position detection function as described above, the optical position detection apparatus 10 is provided with the optical unit 11 that is on the side of the back surface 8b that is opposite to the screen surface 8a (visible surface 41) of the screen 80 (visible surface configuration member 40). Due to this, the optical unit 11 emits the detection light L2 from the side opposite to the visible surface 41 to the detection space 10R set on the side of the visible surface 41 on the screen 80 (visible surface configuration member 40). Further, the optical unit 11 detects the detection light L3 that is reflected by the target object Ob and passes through the screen 80. Accordingly, the screen 80 is light-transmissive with respect to the detection light L2. More specifically, the screen 80 is made of cloth, of which one surface that forms the screen surface 8a is coated with white paint, or a white screen made of a white embossed vinyl material, and is light-transmissive with respect to the detection light L2 composed of infrared light. The screen 80 may be a silver screen with a high silver color to improve the light reflection rate, a pearl screen on which the surface of the cloth that forms the side of the screen surface 8a is resin-treated to heighten the light reflection rate, or a piece screen on which minute glass powder is spread on the side of the screen surface 8a to heighten the light reflection rate, and even in this case, the screen 80 is light-transmissive with respect to the detection light L2 composed of infrared light. In order to heighten the quality of a displayed image, the screen 80 may have a black shielding layer that is formed on the back surface 8b of the screen 80, and in this case, a plurality of light transmissive portions composed of holes may be formed on the shielding layer.

In the screen device 8 having the position detection function as described above, for example, by approaching the target object Ob such as a finger end or the like to a part of an image projected onto the screen 80, the position of the target object Ob can be used as input information such as instruction for changing the image.

In this embodiment, as the screen device 8 having the position detection function, the screen device for the projection display device onto which the image from the image projection device 250 is projected has been described. However, a screen device having the position detection function for an electronic blackboard may be configured by installing the optical position detection apparatus 10 on the screen of the electronic blackboard.

Configuration Example of a Show Window Having a Position Detection Function

Figure 21A:
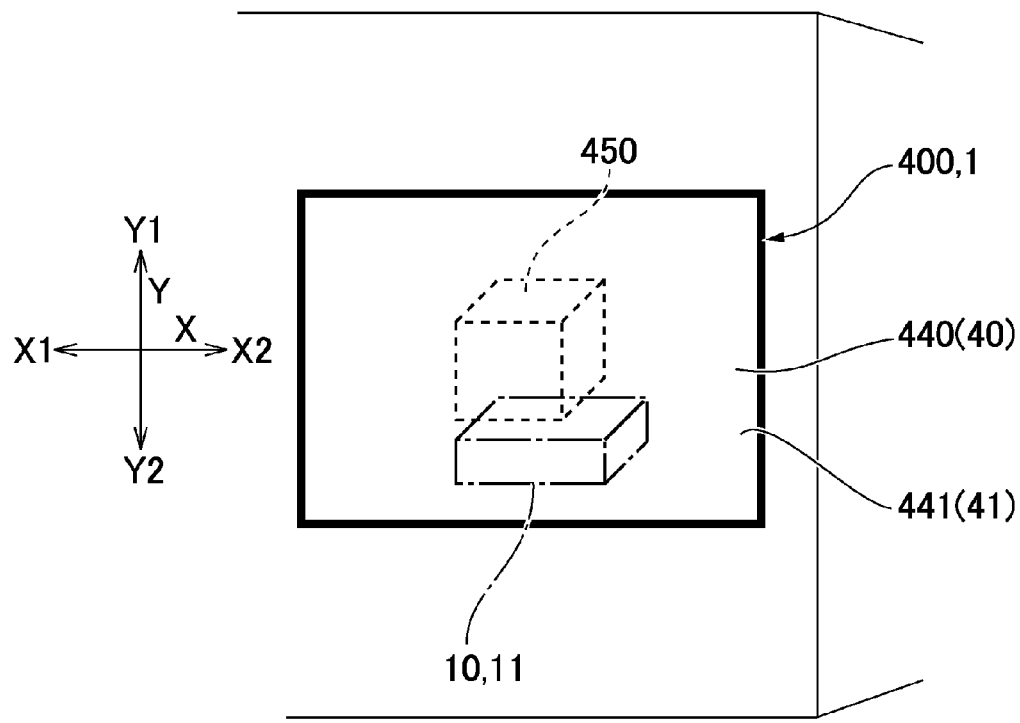
FIGS. 21A and 21B are explanatory views of a window having another position detection function (an appliance having a position detection function) to which the invention is applied.
Figure 21B:
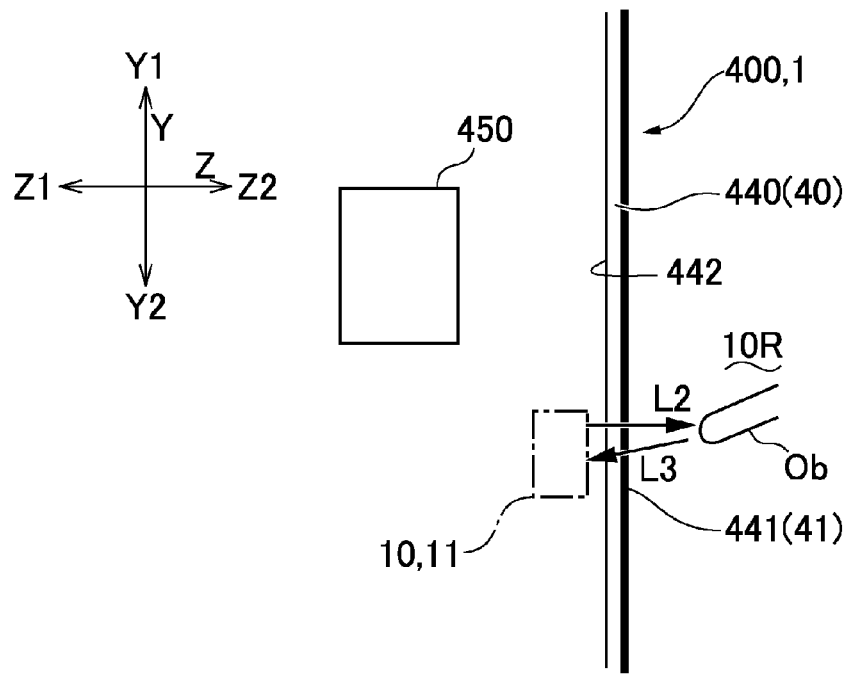

FIGS. 21A and 21B are explanatory views of a window (an appliance 1 having a position detection function) having a position detection function to which the invention is applied, in which FIG. 21A is an explanatory view schematically illustrating a window having the position detection function as seen from the outside (visible surface side), and FIG. 21B is an explanatory view schematically illustrating the cross section of the window. In the window having the position detection function in this embodiment, since the configuration of the optical position detection apparatus 10 is the same as that as described above with reference to FIGS. 1 to 11, the same reference numerals are used for the common portions, and the description thereof will be omitted.

The window 400 having the position detection function as illustrated in FIGS. 21A and 21B includes a light transmissive member 440 (visible surface configuration member 40) that covers the exhibit 450 as information, and visible surface (visible surface 41) of the exhibit 450 is configured by the outer surface 441 of the light transmissive unit 440. Further, in the window 400 having the position detection function, the exhibit 450 is maintained on an actuator (not illustrated) that makes the exhibit 450 perform an operation such as forward movement and swing.

The window 400 having the position detection function as described above is provided with the optical unit 11 of the optical position detection apparatus 10 as described above with reference to FIGS. 1 to 11 on the side of the inner surface 442 of the light transmissive member 440, and the optical unit 11 emits the detection light L2 from the inner side of the light transmissive member 440 to the side of the outer surface 441 (visible surface 41) of the light transmissive member 440. Further, the optical unit 11 detects the detection light L3 that is reflected by the target object Ob and passes through the light transmissive member 440.

In the window 400 having the position detection function as described above, the detection space 10R of the optical position detection apparatus 10 is installed on the side of the outer surface 441 of the light transmissive member 440. Accordingly, by approaching the target object Ob such as a finger end or the like to the detection space 10R, the position of the target object Ob can be used as input information such as instruction for changing the direction of the exhibit 450. For example, if the target object Ob such as the finger end or the like moves downward, the exhibit 450 approaches the light transmissive member 440, while if the target object Ob such as the finger end or the like moves to the right, the direction of the exhibit 450, such as swing the exhibit 450 to the right, can be changed.

Figure 22A:
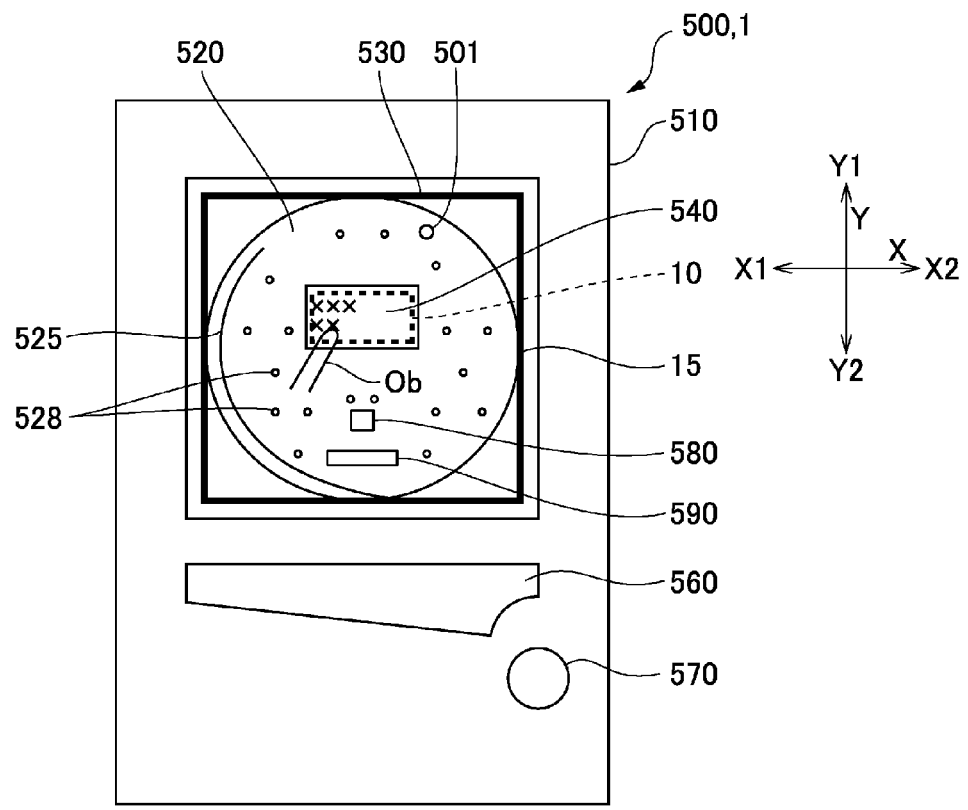
FIGS. 22A and 22B are explanatory views of an amusement device having another position detection function (an appliance having a position detection function) to which the invention is applied.
Figure 22B:
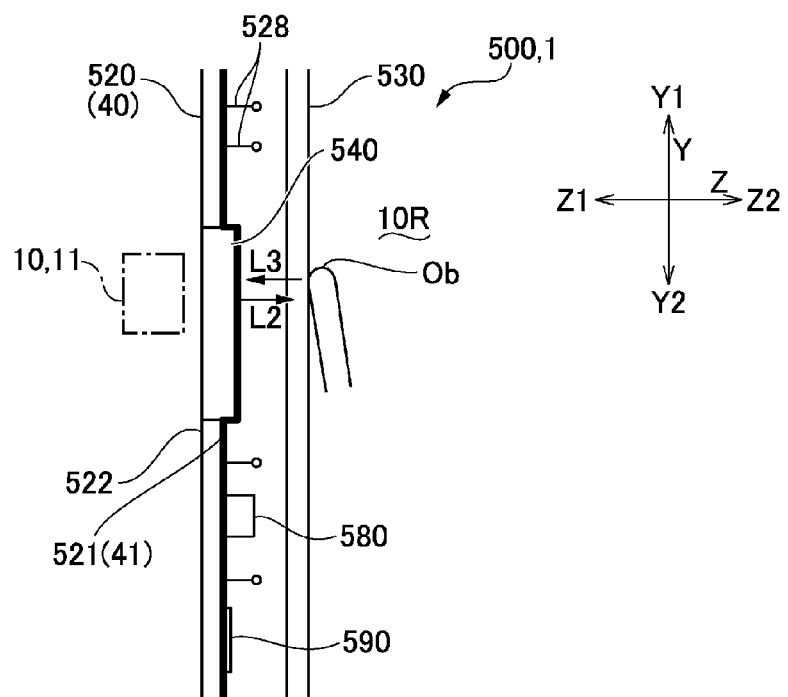

Configuration Example of an Amusement Appliance Having a Position Detection Function FIGS. 22A and 22B are explanatory views of an amusement appliance having another position detection function (an appliance 1 having a position detection function) to which the invention is applied, in which FIG. 22A is an explanatory view schematically illustrating an amusement appliance having the position detection function as seen from the front portion (visible surface side), and FIG. 22B is an explanatory view schematically illustrating the cross section thereof. In the amusement appliance having the position detection function in this embodiment, since the configuration of the optical position detection apparatus 10 is the same as that as described above with reference to FIGS. 1 to 11, the same reference numerals are used for the common portions, and the description thereof will be omitted.

The amusement appliance 500 having the position detection function as illustrated in FIGS. 22A and 22B includes a plate-shaped base 520 (visible surface configuration member 40) that supports a medium for a game 501 such as pachinko glass beads, an outer frame 510 for maintaining the base 520, a handle 570 for setting a position or the like in which the game medium 501 is output onto the base 520, and a saucer 560 for receiving the game medium 501. The surface 521 (visible surface 41) of the base 520 is covered by a glass plate 530, and inside the glass plate 530 on the surface 521 of the base 520, a guide rail 525 for the game medium 501, a nail 528 for changing the movement of the game medium 501, and winning openings 580 and 590 are provided. Further, inside the glass plate 530 on the surface 521 of the base 520, an image generation device 540 for displaying the result of the lottery that is performed whenever the game medium 501 enters into the winning opening 580.

In the amusement appliance 500 having the position detection function, the optical unit 11 of the optical position detection apparatus 10 described with reference to FIGS. 1 to 11 is installed on the back surface 522 of the base 520, and the optical unit 11 emits the detection light L2 from the side of the back surface 522 of the base 520 to the detection space 10R set on the side of the surface 452 (visible surface 41). Further, the optical unit 11 detects the detection light L3 that is reflected by the target object Ob and passes through the light transmissive member 440.

In arranging the optical position detection apparatus 10 as described above, in this embodiment, the image generation device 540 is configured as the direct-view display device 100 having the position detection function as described above with reference to FIG. 19. That is, the optical unit 11 is installed on the back surface side of the image generation device 540. Due to this, in the amusement appliance 500 having the position detection function in this embodiment, the detection space 10R is set in a region that overlaps the image generation device 540 of the side of the surface 452 (the side of the visible surface 41) of the base 520. Further, in this embodiment, the outer surface side of the glass plate 530 is considered as the detection space 10R, and the position of the target object Ob that is positioned in the detection space 10R is detected.

Accordingly, if a gamer approaches the target object Ob such as a finger end or the like to the detection space 10R to match the contents displayed on the image generation device 540 or the progress of the game, the position of the target object Ob can be used as input information such as instruction for changing the contents displayed on the image generation device 540.

In configuring the amusement appliance 500 having the position detection function, if the base 520 is configured so that the detection light L2 composed of the infrared light can pass through the base 520, the region that overlaps the base 520 can be set as the detection space 10R. Further, if the region that overlaps the light source unit 12 and the light receiving unit 30 of the optical unit 11 is configured so that the detection light L2 composed of the infrared light can pass through the region in the base 520, the region that overlaps the base 520 can be set as the detection space 10R.

The entire disclosure of Japanese Patent Application No. 2010-175120, filed Aug. 4, 2010 is expressly incorporated by reference herein.

What is claimed is:

1. An optical position detection apparatus optically detecting the position of a target object, comprising:
   a light source unit emitting detection light and default light;
   a light receiving unit receiving the detection light that is reflected by the target object located in an emission space of the detection light;
   a position detection unit detecting the position of the target object in the emission space based on the result of the light reception in the light receiving unit when the light source unit is turned on; and
   a reflection unit reflecting the default light emitted from the light source unit, wherein
   the detection light emitted from the light source reaches the target object without passing through another object other than ambient air, and the detection light reflected by the target object reaches the light receiving unit without passing through the another object other than the ambient air, and
   when the light receiving unit receives the default light reflected by the reflection unit, the default light is used for default setting of the optical position detection apparatus if the target object is out of the emission space.

2. The optical position detection apparatus according to claim 1, further comprising a housing that covers the light source unit and the light receiving unit;
   wherein the reflection unit for generating the default light is configured by a front-side housing portion that is located on the light emission side of the light source unit in the housing.

3. An appliance having a position detection function comprising an optical position detection apparatus of claim 2 and a visible surface configuration member having a visible surface.

4. The optical position detection apparatus according to claim 1, wherein a plurality of light source units are installed, and
   the position detection unit detects the position of the target object based on a result of comparing drive conditions when the light source units are driven so that the light intensity in the light receiving unit in a state in which a part of the light source units are turned on becomes equal to the light intensity in the light receiving unit in a state in which the other parts of the light source units are turned on among the plurality of light source units.

5. An appliance having a position detection function comprising an optical position detection apparatus of claim 4 and a visible surface configuration member having a visible surface.

6. An appliance having a position detection function comprising an optical position detection apparatus of claim 1 and a visible surface configuration member having a visible surface.

7. An optical position detection apparatus optically detecting the position of a target object, comprising:
   a light source unit emitting detection light;
   a light receiving unit receiving the detection light that is reflected by the target object located in an emission space of the detection light;
   a position detection unit detecting the position of the target object in the emission space based on the result of the light reception in the light receiving unit when the light source unit is turned on; and
   a default light source unit for generating a default light in conjunction with the light source unit, wherein
   the detection light emitted from the light source reaches the target object without passing through another object other than ambient air, and the detection light reflected by the target object reaches the light receiving unit without passing through the another object other than the ambient air, and
   when the light receiving unit receives the default light, the default light is used for default setting of the optical position detection apparatus if the target object is out of the emission space.

8. The optical position detection apparatus according to claim 7, wherein a light source that is used in the default light source unit for generating the default light is electrically connected to a light source that is used in the light source unit in parallel or in series.

9. An appliance having a position detection function comprising an optical position detection apparatus of claim 8 and a visible surface configuration member having a visible surface.

10. An appliance having a position detection function comprising an optical position detection apparatus of claim 7 and a visible surface configuration member having a visible surface.

11. An optical position detection apparatus optically detecting the position of a target object, comprising:
   a light source unit emitting detection light;
   a light receiving unit receiving the detection light that is reflected by the target object located in an emission space of the detection light;
   a position detection unit detecting the position of the target object in the emission space based on the result of the light reception in the light receiving unit when the light source unit is turned on;
   a reflection unit for generating a default light that reflects a part of the detection light emitted from the light source unit and makes the reflected light be incident to the light receiving unit as the default light in a case where the target object is not present in the emission space; and
   a housing that covers the light source unit and the light receiving unit, wherein the reflection unit for generating the default light is configured by a front-side housing portion that is located on the light emission side of the light source unit in the housing, and the reflection unit for generating the default light has a higher reflection rate than that in a portion other than the portion which forms the reflection unit for generating the default light in the front-side housing portion.

12. The optical position detection apparatus according to claim 11, wherein a plurality of light source units are installed, and the position detection unit detects the position of the target object based on a result of comparing drive conditions when the light source units are driven so that the light intensity in the light receiving unit in a state in which a part of the light source units are turned on becomes equal to the light intensity in the light receiving unit in a state in which the other parts of the light source units are turned on among the plurality of light source units.

13. An appliance having a position detection function comprising an optical position detection apparatus of claim 12 and a visible surface configuration member having a visible surface.

14. An appliance having a position detection function comprising an optical position detection apparatus of claim 11 and a visible surface configuration member having a visible surface.

* * * * *